United States Patent
Benton, Jr. et al.

(10) Patent No.: US 11,926,979 B2
(45) Date of Patent: *Mar. 12, 2024

(54) EROSION CONTROL MAT SYSTEM

(71) Applicant: WASKEY BRIDGES, INC., Baton Rouge, LA (US)

(72) Inventors: Stephen G. Benton, Jr., Metairie, LA (US); Kevin Babin, Baton Rouge, LA (US)

(73) Assignee: WASKEY BRIDGES, INC., Baton Rouge, LA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/516,359

(22) Filed: Nov. 1, 2021

(65) Prior Publication Data

US 2022/0120049 A1 Apr. 21, 2022

Related U.S. Application Data

(63) Continuation of application No. 16/817,495, filed on Mar. 12, 2020, now Pat. No. 11,162,237.

(Continued)

(51) Int. Cl.
*E02B 3/12* (2006.01)

(52) U.S. Cl.
CPC ........ *E02B 3/122* (2013.01); *E01C 2201/167* (2013.01)

(58) Field of Classification Search
CPC .............................. E02B 3/122; E01C 2201/167
See application file for complete search history.

(56) References Cited

U.S. PATENT DOCUMENTS

| 869,566 A | 10/1907 | Hawkes |
| 1,939,417 A | 12/1933 | Schulz |

(Continued)

FOREIGN PATENT DOCUMENTS

EP 0152232 8/1985

OTHER PUBLICATIONS

PCT International Search Report and the Written Opinion of the International Searching Authority, PCT International Application No. PCT/US2017/059698; dated Mar. 8, 2018.

*Primary Examiner* — Kyle Armstrong
(74) *Attorney, Agent, or Firm* — Garvey, Smith & Nehrbass, Patent Attorneys, L.L.C.; Charles C. Garvey, Jr.; Vanessa M. D'Souza

(57) ABSTRACT

A concrete mat apparatus, including a plurality of elongated concrete members, each member being aligned with and next to another concrete member. Each of the concrete members has an upper generally flat surface, a lower generally flat surface, and a plurality of inclined surfaces that each extend away from an upper or lower surface. Reinforcement extends from a first end portion of each concrete member to a second end portion thereof, the reinforcement including a plurality of longitudinally extending reinforcement bars and a plurality of encircling tie bars at spaced apart intervals. Cabling connects each of the elongated concrete members to another of the elongated concrete members. The combination of elongated concrete members has a width and a length that is at least twice as long as the width. The upper inclined surfaces of one of the elongated concrete members forms a plane with the lower inclined surface of an adjacent elongated concrete member. A plurality of loops are provided along opposed edges of the mat, each loop formed by a portion of the cabling. The loops can (Continued)

be spaced between about one and three feet (30.5 and 91.4 cm) apart.

28 Claims, 19 Drawing Sheets

Related U.S. Application Data

(60) Provisional application No. 62/922,218, filed on May 28, 2019.

(56) References Cited

U.S. PATENT DOCUMENTS

| | | |
|---|---|---|
| 1,983,772 A | 12/1934 | Pierson |
| 2,454,292 A | 11/1948 | Pickett |
| 3,386,252 A | 6/1968 | Nelson |
| 3,486,341 A | 12/1969 | Huesker-Stiewe et al. |
| 3,595,140 A | 7/1971 | Lundin |
| 3,597,928 A | 8/1971 | Pilaar |
| 4,102,137 A | 7/1978 | Porraz |
| 4,152,875 A | 5/1979 | Soland |
| 4,227,829 A | 10/1980 | Landry, Jr. |
| 4,242,010 A | 12/1980 | Gjerde et al. |
| 4,375,928 A | 3/1983 | Crow et al. |
| 4,477,208 A | 10/1984 | Papetti et al. |
| 4,486,120 A | 12/1984 | Landry, Jr. |
| 4,664,552 A | 5/1987 | Schaaf et al. |
| 4,683,156 A | 7/1987 | Waters |
| 5,020,938 A | 6/1991 | Scales |
| 5,282,692 A | 2/1994 | McLeod |
| 5,317,846 A | 6/1994 | Michlovic |
| 5,484,230 A | 1/1996 | Rudloff |
| 5,536,111 A | 7/1996 | Doernemann |
| 5,632,571 A | 5/1997 | Mattox |
| 5,722,795 A | 3/1998 | Angel et al. |
| 5,775,835 A | 7/1998 | Szekely |
| 5,775,838 A | 7/1998 | Pettee, Sr. |
| 5,846,023 A | 12/1998 | Angel et al. |
| 5,944,449 A | 8/1999 | Angel et al. |
| 6,027,285 A | 2/2000 | Angel et al. |
| 6,250,591 B1 | 6/2001 | Cunningham |
| 6,406,217 B1 | 6/2002 | Daniel et al. |
| 6,416,253 B1 | 7/2002 | Wimp et al. |
| 6,866,446 B2 | 3/2005 | McAllister et al. |
| 7,278,613 B2 | 10/2007 | Roy |
| 7,470,093 B2 | 12/2008 | Stecher |
| 7,708,495 B1 | 5/2010 | Antee |
| 8,256,178 B2 | 9/2012 | Moreno |
| 8,496,396 B1 | 7/2013 | Allen |
| 8,858,118 B2 | 10/2014 | Benton, Jr. |
| 8,919,057 B1 | 12/2014 | Dupray |
| 9,518,388 B1 | 12/2016 | Wang |
| 10,301,788 B2 | 5/2019 | Benton, Jr. |
| 11,162,237 B2 | 11/2021 | Benton, Jr. et al. |
| 2002/0104469 A1 | 8/2002 | Veazey |
| 2003/0017000 A1 | 1/2003 | Jansson |
| 2003/0031509 A1 | 2/2003 | Marsik, Jr. |
| 2005/0220539 A1 | 10/2005 | Yee |
| 2006/0230696 A1 | 10/2006 | Sarkkinen |
| 2008/0022623 A1 | 1/2008 | Brienen |
| 2012/0047816 A1 | 3/2012 | Zhong |
| 2012/0317906 A1 | 12/2012 | Hammond |
| 2013/0279983 A1 | 10/2013 | Benton, Jr. |
| 2014/0197283 A1 | 7/2014 | Lake |
| 2018/0119377 A1 | 5/2018 | Benton, Jr. |

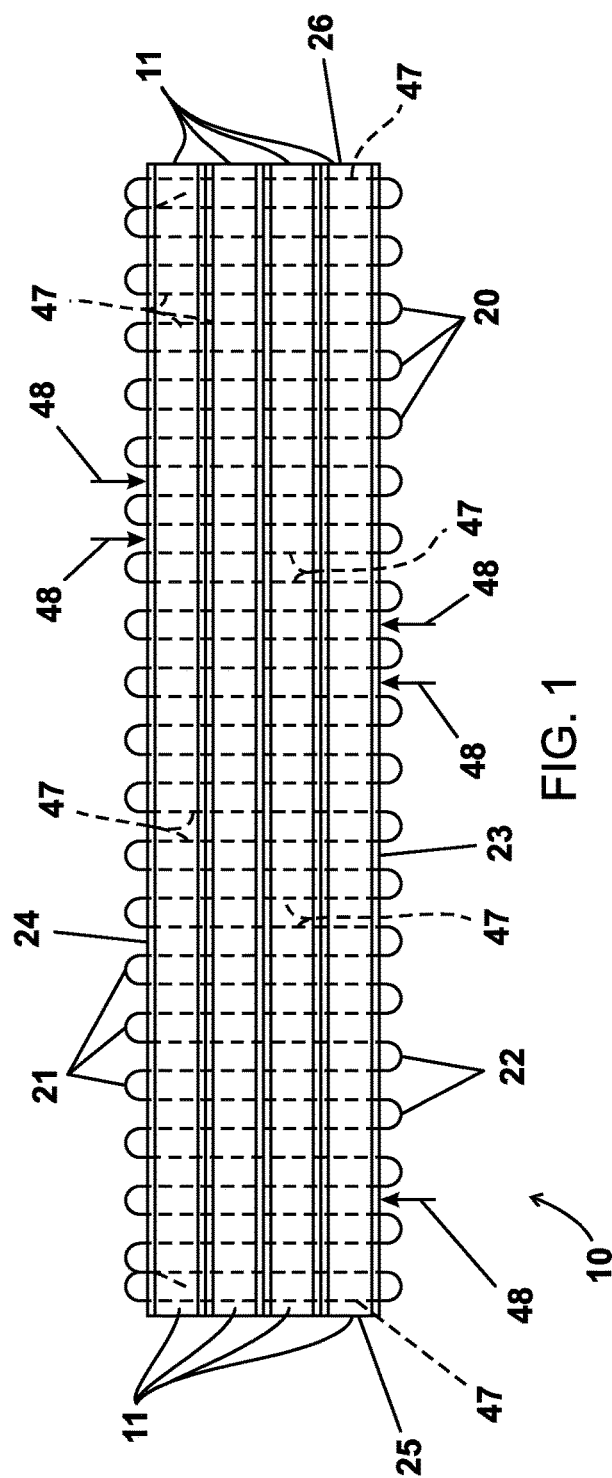
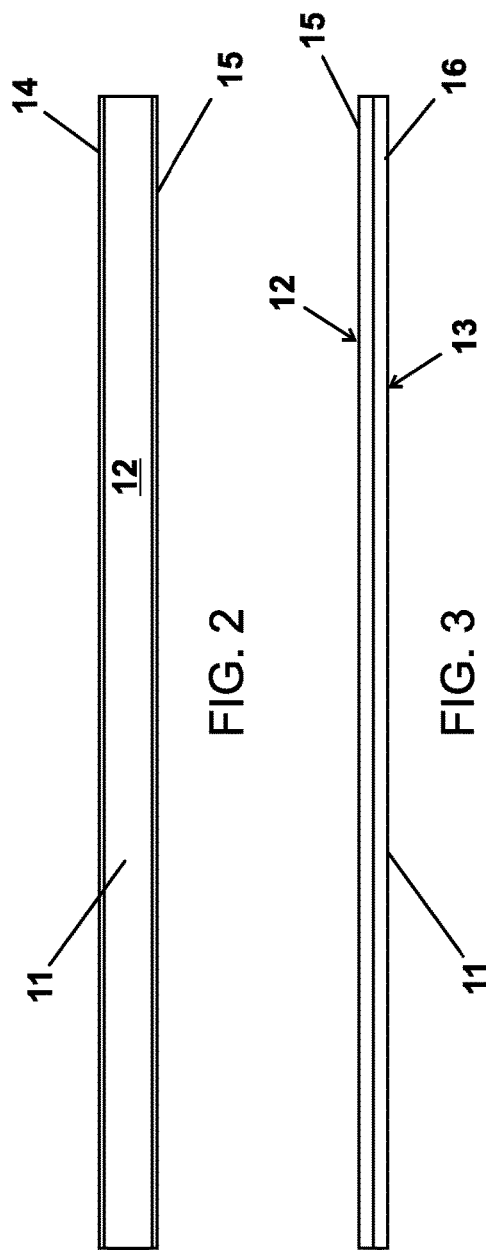

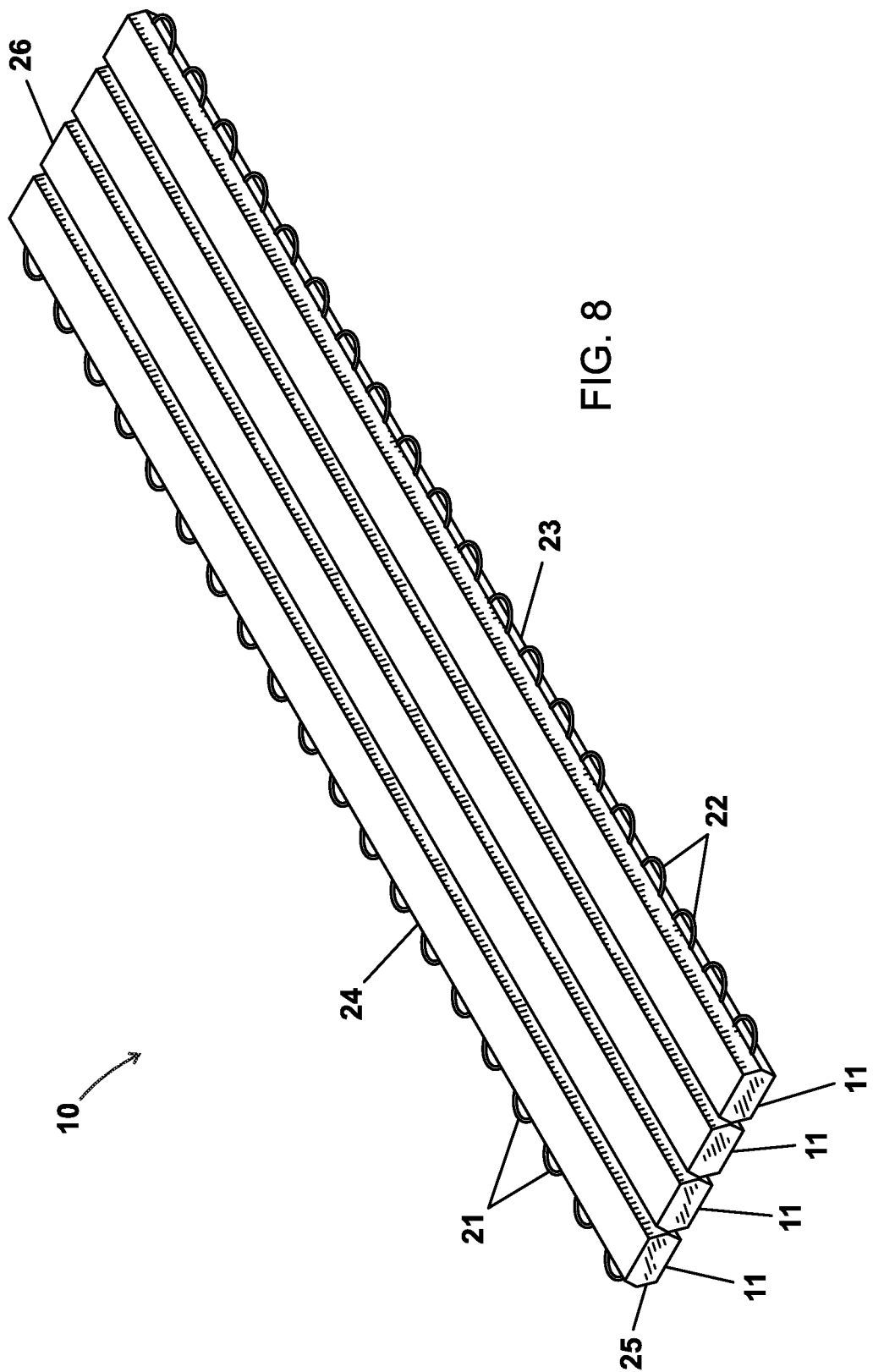

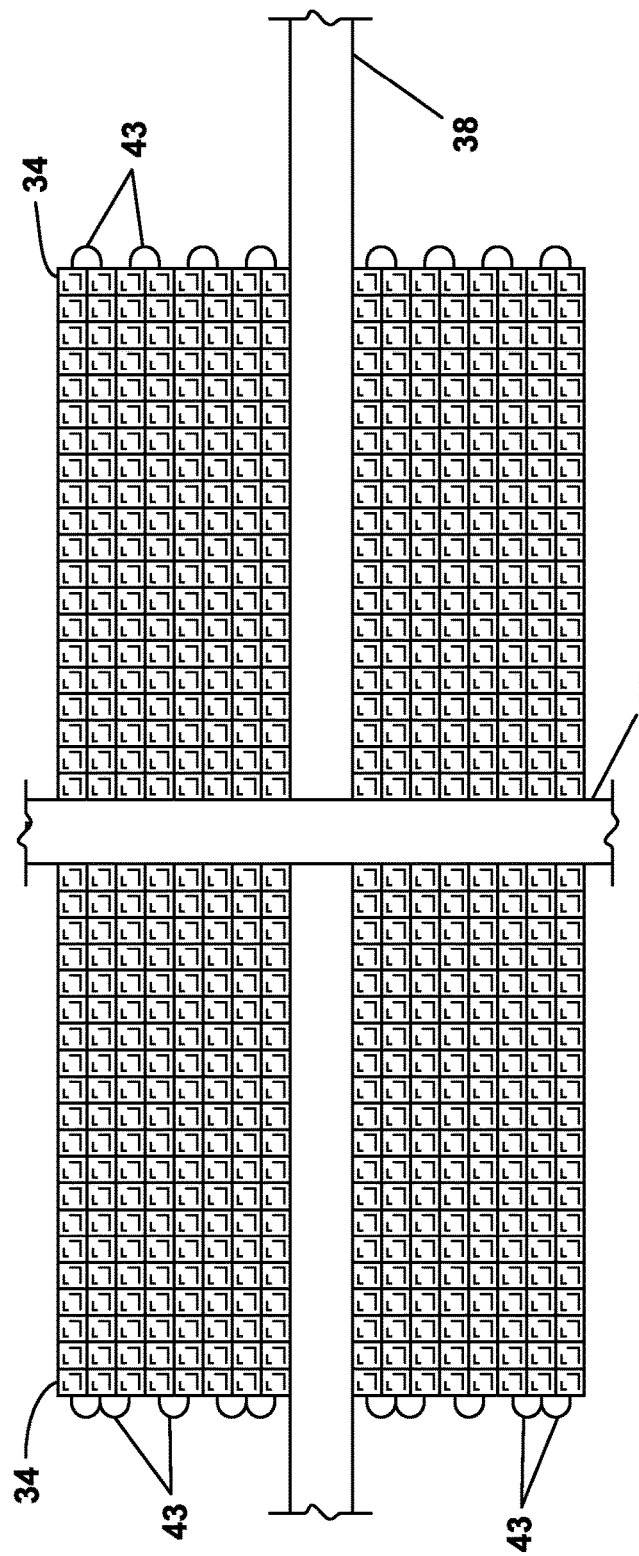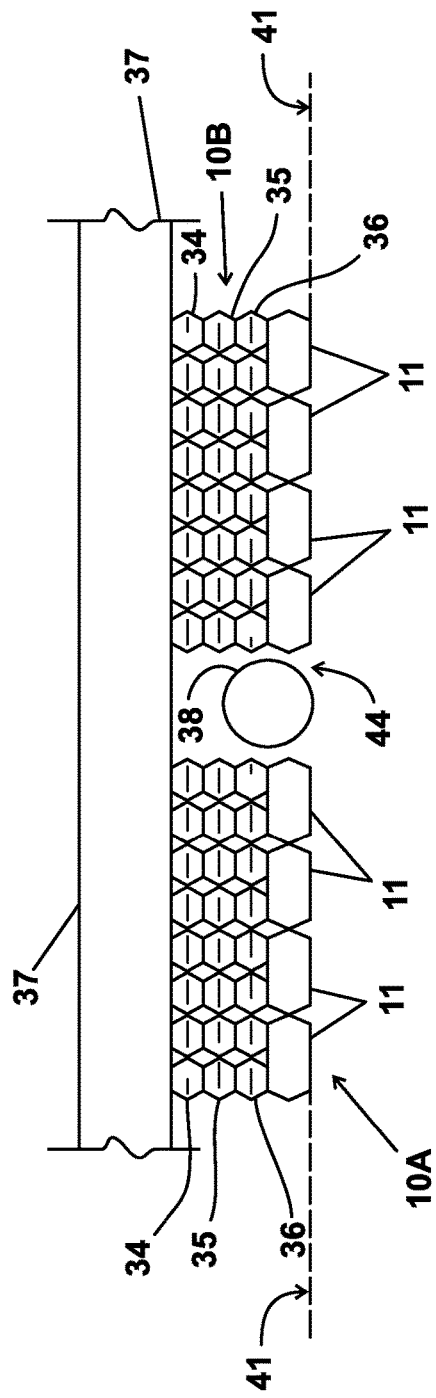
FIG. 16
FIG. 17

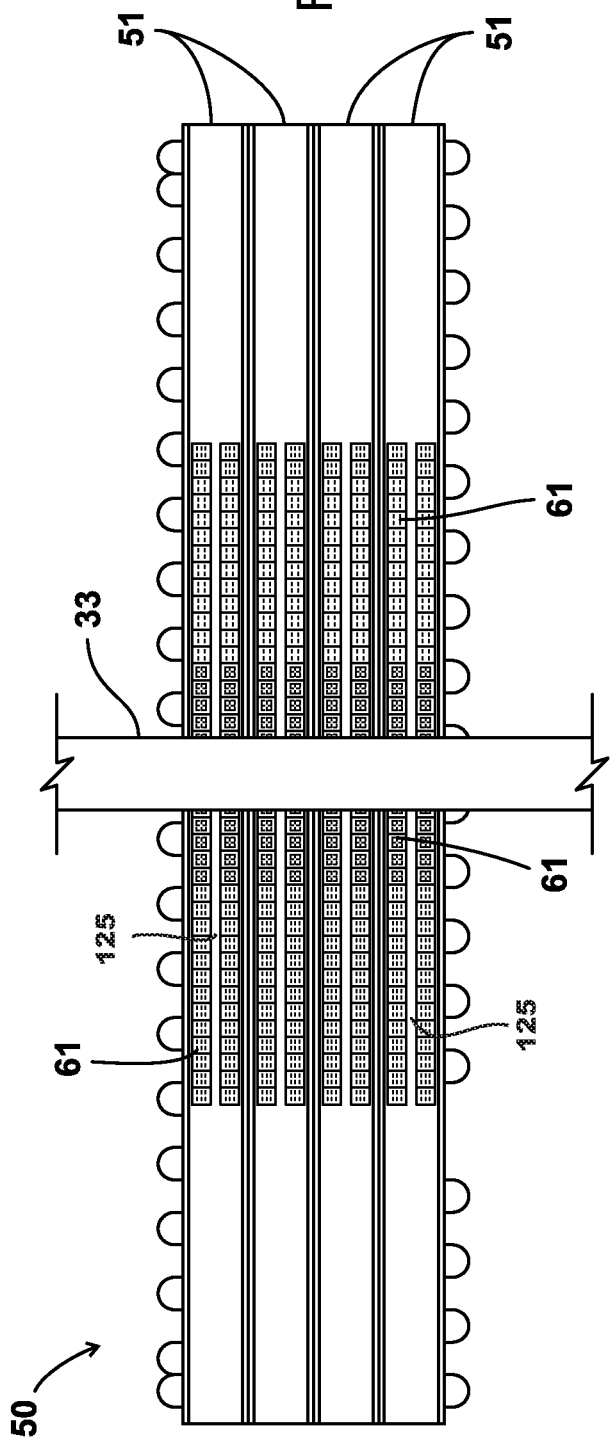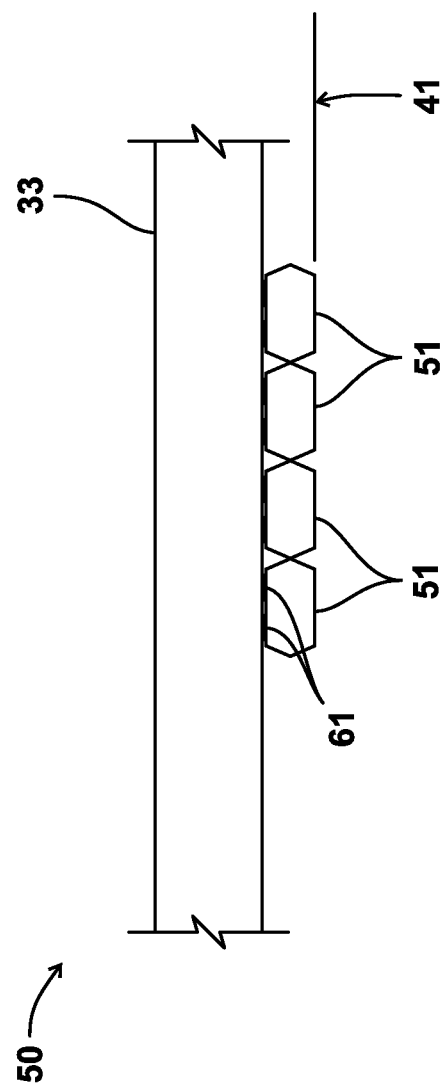

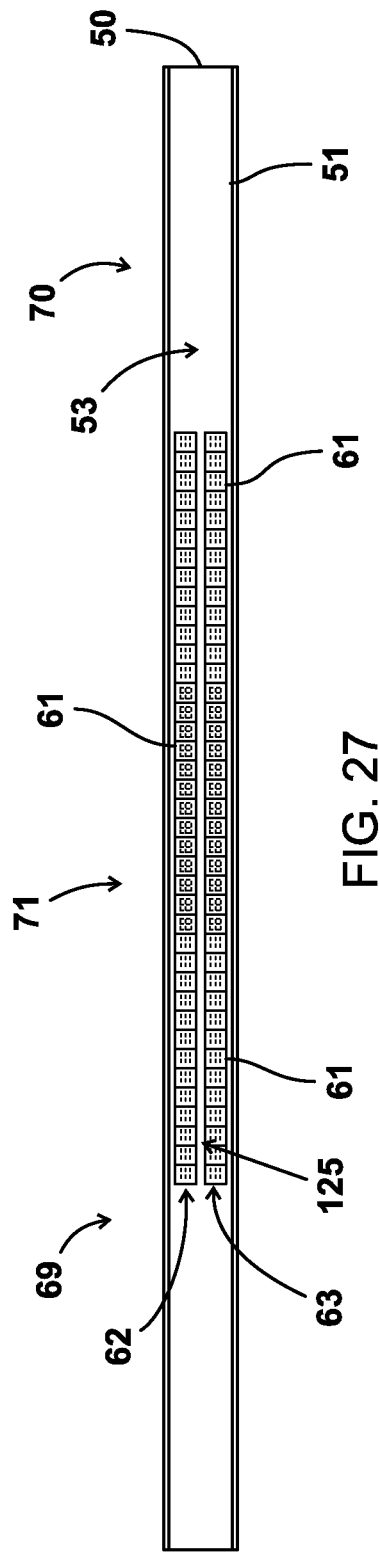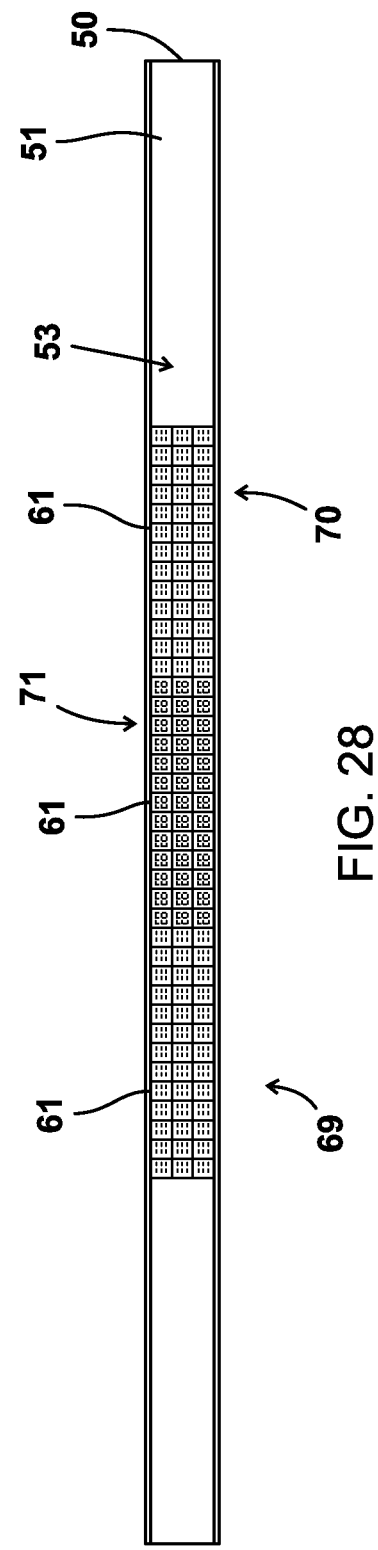

EROSION CONTROL MAT SYSTEM

CROSS-REFERENCE TO RELATED APPLICATIONS

The application claims benefit of U.S. Provisional Patent Application No. 62/922,218, filed 28 May 2019, which is hereby incorporated herein by reference and priority to/of which is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to mats used for erosion control, pipeline protection, crossings, and many other subsea uses, and methods of installing such mats.

2. General Background of the Invention

Erosion control mats have been used for many years to protect soil surfaces such as the banks of water bodies (lakes, rivers, etc.). Such mats have also been used as protection for underwater pipelines.

Patents have issued that are directed to erosion control mats. An example of such an erosion control mat is the Pilaar patent (U.S. Pat. No. 3,597,928). The Pilaar patent relates to an erosion controlling protective surface for a soil mass. The device includes a flexible supporting sheet that can conform to the contour of the soil. Blocks are mounted on the supporting sheet. The mat provides drainage passageways therethrough so that water can pass through the surfacing. Preferably, the surfacing includes a filter and the blocks are secured with the supporting sheet.

The Nelson patent (U.S. Pat. No. 3,386,252) shows a rip rap structure that employs concrete blocks connected together.

Cables are employed to hold blocks together in the Landry patent (U.S. Pat. No. 4,227,829) to form a matrix of blocks.

The Crow patent (U.S. Pat. No. 4,375,928) shows rows of blocks held together by a continuous wire cable which is embedded in each block.

The Waters patent (U.S. Pat. No. 4,683,156) shows an erosion control blanket of segments. The segments are said to be of concrete placed into shells. The segments are held together with a rope network. Openings in the shells provide points of entry for the ropes.

The Rudloff patent (U.S. Pat. No. 5,484,230) provides a concrete block revetment system for soil erosion prevention. The system of the Rudloff patent provides concrete blocks that are cable interconnected to form a matrix. The matrix of blocks overlies and holds in place a layer of permeable geotextile overlying a protected soil area.

The Angel patent (U.S. Pat. No. 6,027,285) entitled "Mat Installation" shows cable connected erosion control blocks that can be used over pipelines. Other patents issued to Angel include numbers U.S. Pat. Nos. 5,722,795; 5,846,023; and 5,944,449.

The Landry patent (U.S. Pat. No. 4,486,120) provides a spreader bar for the installation of soil erosion prevention mats.

The Daniel patent (U.S. Pat. No. 6,406,217) provides a lifting and placing device for seabed mats.

The following patents/applications are hereby incorporated herein by reference: U.S. patent application Ser. No. 16/393,278, filed 24 Apr. 2019 (published as US 2019/0345683 on 14 Nov. 2019); U.S. patent application Ser. No. 15/801,560, filed 2 Nov. 2017 (now U.S. Pat. No. 10,301,788 issued on 28 May 2019); U.S. Provisional patent application Ser. No. 62/416,524, filed 2 Nov. 2016; and U.S. Provisional Patent Application Ser. No. 62/525,697, filed 27 Jun. 2017.

Other patents possibly relevant to the construction and use of mats for erosion control, pipeline protection, crossings, and other subsea uses can be seen in the following table, the listing being chronological and otherwise of no significance. Each of the patents listed in the table (Table 1) is hereby incorporated herein by reference.

TABLE 1

| Pat. No. | Title | Issue Date MM/DD/YYYY |
| --- | --- | --- |
| 1,983,772 | Concrete Mat | 12/11/1934 |
| 3,386,252 | Rip Rap Structure Device | 09/08/1966 |
| 3,597,928 | Erosion Control | 08/10/1971 |
| 4,227,829 | Soil Erosion Preventing Blocks | 10/14/1980 |
| 4,375,928 | Flexible Concrete For Soil Erosion Prevention | 03/08/1983 |
| 4,486,120 | Spreader Bar For Soil Erosion Prevention Mats | 12/04/1984 |
| 4,683,156 | Flexible Blanket | 07/28/1987 |
| 5,317,846 | Underfloor Wire Distributing Reinforced Concrete Floor Structure | 06/07/1994 |
| 5,484,230 | Concrete Block Revetment System For Soil Erosion Prevention | 01/16/1996 |
| 5,722,795 | Non-Abrasive Subsea Mat | 03/03/1998 |
| 5,846,023 | Non-Abrasive Subsea Mat | 12/08/1998 |
| 5,944,449 | Non-Abrasive Subsea Mat | 08/31/1999 |
| 6,027,285 | Mat Installation | 02/22/2000 |
| 6,250,591 | Conduit Support Assembly | 06/26/2001 |
| 6,406,217 | Lifting and Placing Device for Seabed Mats | 06/18/2002 |
| 8,858,118 | Erosion Control Mat System | 10/14/2014 |
| 2013/0279983 | Erosion Control Mat System | 10/24/2013 |
| 9,518,366 | Erosion Control Mat System | 12/13/2016 |
| 9,797,105 | Erosion Control Mat System | 10/24/2017 |
| 10/301,788 | Erosion Control Mat System | 05/28/2019 |
| 2019/0345683 | Erosion Control Mat System | 11/14/2019 |

BRIEF SUMMARY OF THE INVENTION

The present invention provides an improved mat used for erosion control, pipeline protection, crossings, equipment support and other subsea uses, that utilizes a plurality of specially configured elongated concrete members.

In a preferred embodiment of the present invention, cables or ropes, e.g., copolymer rope, connect the elongated concrete members together to form a matrix. The cables or ropes can include multiple cables or ropes or one continuous cable/rope that is looped from one elongated concrete member to the next member.

The present invention includes a concrete mat apparatus, comprising a plurality of elongated concrete members, each member can be aligned with and next to another concrete member. Each of the concrete members can have an upper generally flat surface, a lower generally flat surface, and a plurality of inclined surfaces that each preferably extend away from an upper or lower surface. Reinforcement that can extend from a first end portion of each concrete member to a second end portion thereof. The reinforcement preferably including a plurality of longitudinally extending reinforcement bars and a plurality of encircling stirrups at spaced apart intervals. Cabling can connect each of the elongated concrete members to another of the elongated concrete members. The cabling preferably including generally parallel cable sections. Each cable section preferably extending transversely through multiple of said concrete members. The combination of elongated concrete members can have a width and a length that is at least twice as long as the width. The upper inclined surfaces of one of the elongated concrete members can form a plane with the lower inclined surface of an adjacent elongated concrete member. A plurality of loops can be along opposed edges of the mat, each loop formed by a portion of the cabling. The loops can be between about one and three feet (30.5 and 91.4 cm) apart. There can be stirrups on each side of a cable section.

In one embodiment, there can be least three of the elongated concrete members.

In one embodiment, there can be at least four of the elongated concrete members.

In one embodiment, each of the elongated concrete members can be about 40 feet (12.2 meters) in length.

In one embodiment, each of the elongated concrete members can be between about 20 and 40 feet (6.1-12.2 meters) long.

In one embodiment, the reinforcement includes a plurality of upper longitudinally extending reinforcement bars and a plurality of lower longitudinally extending reinforcement bars.

In one embodiment, each of the loops can be positioned at the intersection of an upper inclined surface and a lower inclined surface.

In one embodiment, the upper plurality of longitudinally extending reinforcement bars can be positioned in between two upper inclined surfaces.

In one embodiment, the plurality of longitudinally extending reinforcement bars can be positioned in between two lower inclined surfaces.

In one embodiment, the cabling can be positioned in a plane that is in between the upper and lower pluralities of longitudinally extending reinforcement bars.

In one embodiment, the loops can be formed with a continuous one piece elongated cable.

In one embodiment, the loops can be formed of a plurality of endless circular rope sections, each endless rope section including a first and a second spaced apart loops.

In one embodiment, each elongated concrete member can have a width and a height, the width being greater than the height.

In one embodiment, the mat apparatus can have an overall length and a width, wherein the overall length can be greater than the width.

In one embodiment, the length can be at least double the width.

In one embodiment, the length can be at least triple the width.

The present invention includes a concrete mat apparatus, comprising a plurality of elongated concrete members, each member preferably aligned with and next to another concrete member. Each of the concrete members can have an upper generally flat surface, a lower generally flat surface, and a plurality of inclined surfaces that each can extend away from an upper or lower surface. Reinforcement can extend from a first end portion of each concrete member to a second end portion thereof. The reinforcement preferably including a plurality of longitudinally extending reinforcement bars and a plurality of encircling tie bars at spaced apart intervals. Cabling can preferably connect each of the elongated concrete members to another of the elongated concrete members. The combination of elongated concrete members can have a width and a length that can be at least twice as long as the width. The upper inclined surfaces of one of the elongated concrete members can form a plane with the lower inclined surface of an adjacent elongated concrete member. A plurality of loops can be along opposed edges of the mat, each loop preferably formed by a portion of the cabling. The loops can be between about one and three feet (30.5 and 91.4 cm) apart. One or more layers of articulating mats can be stacked upon the concrete members. A pipeline can rest upon the combination of blocks and beams.

In one embodiment, there can be at least three of the elongated concrete members and at least two layers of articulating mats.

In one embodiment, there can be at least four of the elongated concrete members and at least three layers of articulating mats.

In one embodiment, there can be first and second supporting stacks, each stack including multiple of the concrete members and multiple of the articulating mats.

In one embodiment, there can be a gap between the stacks.

In one embodiment, the reinforcement preferably includes a plurality of upper longitudinally extending reinforcement bars and a plurality of lower longitudinally extending reinforcement bars.

In one embodiment, each of the loops can be positioned at the intersection of an upper inclined surface and a lower inclined surface.

In one embodiment, a second pipeline can occupy the gap.

In one embodiment, the pipelines preferably do not contact each other.

In one embodiment, further comprising one or more layers of articulating block mats supported upon the concrete members.

In one embodiment, further comprising a pipeline that can be resting upon the articulating mat layer or layers so that load transfer is from the pipeline, to the articulating mat layer or layers, to the elongated concrete members and to a seabed or water bottom.

In one embodiment, further comprising equipment that can be resting upon the articulating mat layer or layers so that load transfer is from the equipment, to the articulating mat layer or layers, to the elongated concrete members and to a seabed or water bottom.

The present invention includes a concrete mat apparatus, including a plurality of elongated concrete members, each member preferably aligned with and next to another concrete member. Each of the concrete members can have an upper generally flat surface, a lower generally flat surface, and a plurality of inclined surfaces that each preferably extend away from an upper or lower surface. Reinforcement can preferably extend from a first end portion of each concrete member to a second end portion thereof, the reinforcement preferably including a plurality of longitudinally extending reinforcement bars and a plurality of encircling stirrups preferably at spaced apart intervals. Cabling can preferably connect each of the elongated concrete members to another of the elongated concrete members, the cabling preferably including generally parallel cable sections, each cable section preferably extending transversely through multiple of the concrete members. Preferably, the combination of elongated concrete members can have a width and a length that is at least twice as long as the width. The upper inclined surfaces of one of the elongated concrete members can preferably form a plane with the lower inclined surface of an adjacent elongated concrete member. A plurality of loops can be preferably along opposed edges of the mat, each loop formed by a portion of the cabling. There can be stirrups on each side of a cable section. An array of pads can be connected to the upper surface of each concrete member, wherein each pad is preferably spaced apart from others of the pads.

In one embodiment, there can be at least two columns of the pads of the array of pads.

In one embodiment, the pads can be rectangular.

In one embodiment, there can be a first plurality of pads with a first spacing between the pads and a second plurality of pads with a second spacing that is preferably greater than the first spacing.

In one embodiment, each of the pads of the array is preferably at least partially embedded in a concrete member.

In one embodiment, some of the pads can be square and some of the pads can be rectangular.

In one embodiment, the pads can be differing shapes.

In one embodiment, some of the pads of one column can be of differing shapes.

In one embodiment, each pad can have anchors that preferably extend into the concrete member.

The present invention includes a concrete mat apparatus, including a plurality of elongated concrete members, each member preferably being aligned with and next to another concrete member. Each of the concrete members preferably having an upper generally flat surface, a lower generally flat surface, and a plurality of inclined surfaces that each extend away from an upper or lower surface. Reinforcement can extend from a first end portion of each concrete member to a second end portion thereof, the reinforcement preferably including a plurality of longitudinally extending reinforcement bars and a plurality of encircling tie bars at spaced apart intervals. Cabling can connect each of the elongated concrete members to another of the elongated concrete members. The combination of elongated concrete members can have a width and a length that is preferably at least twice as long as the width. The upper inclined surfaces of one of the elongated concrete members preferably forms a plane with the lower inclined surface of an adjacent elongated concrete member. A plurality of loops preferably can be along opposed edges of the mat, each loop formed by a portion of the cabling. An array of pads can be connected to the upper surface of each concrete member to define a padded beam surface, wherein each pad is preferably spaced apart from others of the pads. A pipeline preferably rests upon the padded beam surfaces.

The present invention includes a concrete mat apparatus, including a plurality of elongated concrete members, each member being aligned with and next to another concrete member. Each of the concrete members preferably having an upper generally flat surface, a lower generally flat surface, and a plurality of inclined surfaces that each extend away from an upper or lower surface. Reinforcement preferably extends from a first end portion of each concrete member to a second end portion thereof, the reinforcement preferably including a plurality of longitudinally extending reinforcement bars and a plurality of encircling stirrups at spaced apart intervals. Cabling preferably connects each of the elongated concrete members to another of the elongated concrete members, the cabling preferably including generally parallel cable sections, each cable section preferably extending transversely through multiple of said concrete members. Wherein the combination of elongated concrete members preferably has a width and a length that is at least twice as long as the width. The upper inclined surfaces of one of the elongated concrete members preferably forming a plane with the lower inclined surface of an adjacent elongated concrete member. A plurality of loops are preferably along opposed edges of the mat, each loop preferably formed by a portion of said cabling. Wherein there are preferably stirrups on each side of a cable section. An array of pads preferably connected to the upper surface of each concrete member, wherein each pad is preferably spaced apart from others of the pads, the array preferably including multiple rows of pads and multiple columns of pads. A pipeline preferably resting on the pads.

In various embodiments, there are preferably at least three of said elongated concrete members.

In various embodiments, there are preferably at least two columns of the pads of the array of pads.

In various embodiments, the pads are preferably rectangular.

In various embodiments, there are preferably a first plurality of pads with a first spacing between pads and a second plurality of pads with a second spacing that is greater than the first spacing.

In various embodiments, the reinforcement preferably includes a plurality of upper longitudinally extending reinforcement bars and a plurality of lower longitudinally extending reinforcement bars.

In various embodiments, each of the loops are preferably positioned at the intersection of an upper inclined surface and a lower inclined surface.

In various embodiments, the upper plurality of longitudinally extending reinforcement bars is preferably positioned in between two upper inclined surfaces.

In various embodiments, the plurality of longitudinally extending reinforcement bars are preferably positioned in between two lower inclined surfaces.

In various embodiments, the cabling is preferably positioned in a plane that is in between the upper and lower pluralities of longitudinally extending reinforcement bars.

In various embodiments, each of the pads of the array is preferably at least partially embedded in a concrete member.

In various embodiments, the loops are preferably formed of a plurality of endless circular rope sections, each endless rope section including a first and a second spaced apart loops.

In various embodiments, some of the pads are preferably square and some of the pads are preferably rectangular.

In various embodiments, the pads are preferably differing shapes.

In various embodiments, some of the pads of one of the columns are preferably of differing shapes.

In various embodiments, each pad preferably has anchors that extend into the concrete member.

The present invention includes a concrete mat apparatus, including a plurality of elongated concrete members, each member preferably being aligned with and next to another concrete member. Each of the concrete members preferably having an upper generally flat surface, a lower generally flat surface, and a plurality of inclined surfaces that each extend away from an upper or lower surface. Reinforcement preferably extends from a first end portion of each concrete member to a second end portion thereof, the reinforcement including a plurality of longitudinally extending reinforcement bars and a plurality of encircling tie bars at spaced apart intervals. Cabling preferably connects each of the elongated concrete members to another of the elongated concrete members. The combination of elongated concrete members preferably has a width and a length that is at least twice as long as the width. The upper inclined surfaces of one of the elongated concrete members preferably forming a plane with the lower inclined surface of an adjacent elongated concrete member. A plurality of loops are preferably along opposed edges of the mat, each loop formed by a portion of the cabling. An array of pads preferably connected to the upper surface of each concrete member to define a padded beam surface, wherein each pad is spaced apart from others of the pads. A pipeline preferably positioned above the concrete members, and resting upon the pads.

In various embodiments, preferably further comprising one or more layers of articulating block mats supported upon the concrete members.

In various embodiments, the pipeline is preferably resting upon the articulating mat layer or layers so that load transfer is from the pipeline, to the articulating mat layer or layers, to the elongated concrete members and to a seabed or water bottom.

In various embodiments, preferably further comprising equipment resting upon the articulating mat layer or layers so that load transfer is from the equipment, to the articulating mat layer or layers, to the elongated concrete members and to a seabed or water bottom.

The present invention includes a concrete mat apparatus, including a plurality of elongated concrete members, each member preferably being aligned with and next to another concrete member. Each of the concrete members preferably having an upper generally flat surface, a lower generally flat surface, and a plurality of inclined surfaces that each extend away from an upper or lower surface. Reinforcement preferably extends from a first end portion of each concrete member to a second end portion thereof, the reinforcement including a plurality of longitudinally extending reinforcement bars and a plurality of encircling stirrups at spaced apart intervals. Cabling preferably connects each of the elongated concrete members to another of the elongated concrete members, the cabling including generally parallel cable sections, each cable section extending transversely through multiple of the concrete members. Wherein the combination of elongated concrete members preferably has a width and a length that is at least twice as long as the width. The upper inclined surfaces of one of the elongated concrete members preferably forming a plane with the lower inclined surface of an adjacent elongated concrete member. Multiple pads preferably on the upper surface of each concrete member, the pads covering a majority of the area of each upper surface. Wherein each pad is preferably spaced apart from others of the pads, the multiple pads preferably including multiple rows and multiple columns of pads. A pipeline preferably positioned above the concrete members, bearing on one or more of the pads.

In various embodiments, there are preferably at least two columns of pads of the multiple pads.

In various embodiments, there are preferably a first plurality of pads with a first spacing between pads and a second plurality of pads with a second spacing that is greater than said first spacing.

In various embodiments, each of the pads of the multiple pads is preferably at least partially embedded in a concrete member.

In various embodiments, some of the pads are preferably square and some of the pads are preferably rectangular.

In various embodiments, wherein the pads are preferably differing shapes.

In various embodiments, some of the pads of one of the columns are preferably of differing shapes.

In various embodiments, the pipeline preferably rests upon the pads of multiple of the concrete members.

In various embodiments, the pipeline preferably rests upon multiple rows of the pads.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein:

FIG. 1 is a plan or top view of a preferred embodiment of the apparatus of the present invention;

FIG. 2 is a partial top view of a preferred embodiment of the apparatus of the present invention;

FIG. 3 is a partial side view of a preferred embodiment of the apparatus of the present invention;

FIG. 8 is a perspective view of a preferred embodiment of the apparatus of the present invention;

FIG. 16 is a plan view of a preferred embodiment of the apparatus of the present invention showing first and second pipelines crossing one another at differing elevations;

FIG. 17 is an elevation view of a preferred embodiment of the apparatus of the present invention showing first and second pipelines crossing one another at differing elevations;

FIG. 25 is a plan view of a preferred embodiment of the apparatus of the present invention shown supporting an underwater pipeline;

FIG. 26 is an elevation view of a preferred embodiment of the apparatus of the present invention shown supporting an underwater pipeline;

FIG. 27 is a plan, schematic view showing two rows of pads on a beam;

FIG. 28 is a plan, schematic view showing three rows of pads on a beam;

DETAILED DESCRIPTION OF THE INVENTION

Figure 4:
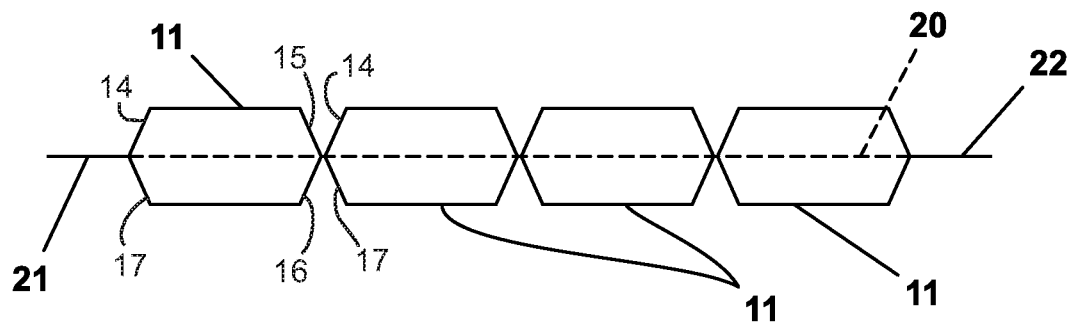
FIG. 4 is a side sectional view of a preferred embodiment of the apparatus of the present invention.
Figure 5:
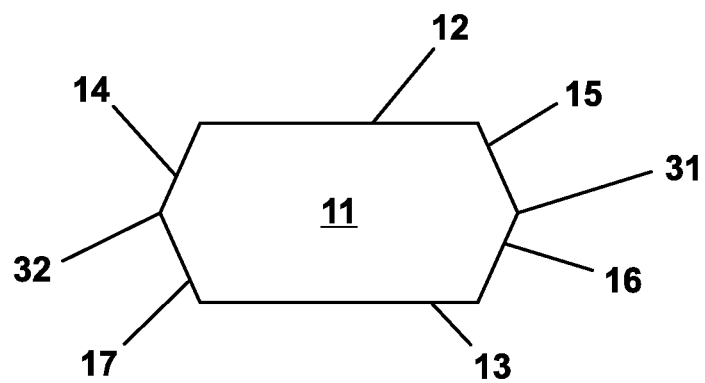
FIG. 5 is a side sectional view of a preferred embodiment of the apparatus of the present invention.
Figure 7:
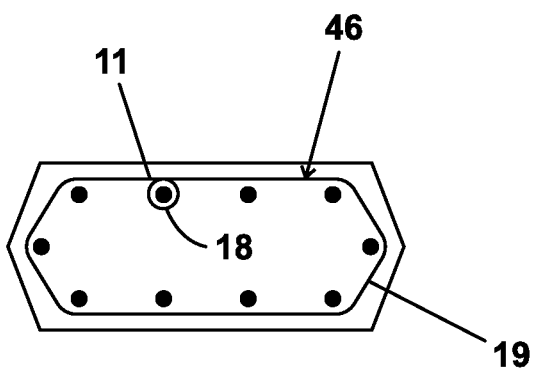
FIG. 7 is a side sectional view of a preferred embodiment of the apparatus of the present invention.
Figure 6:
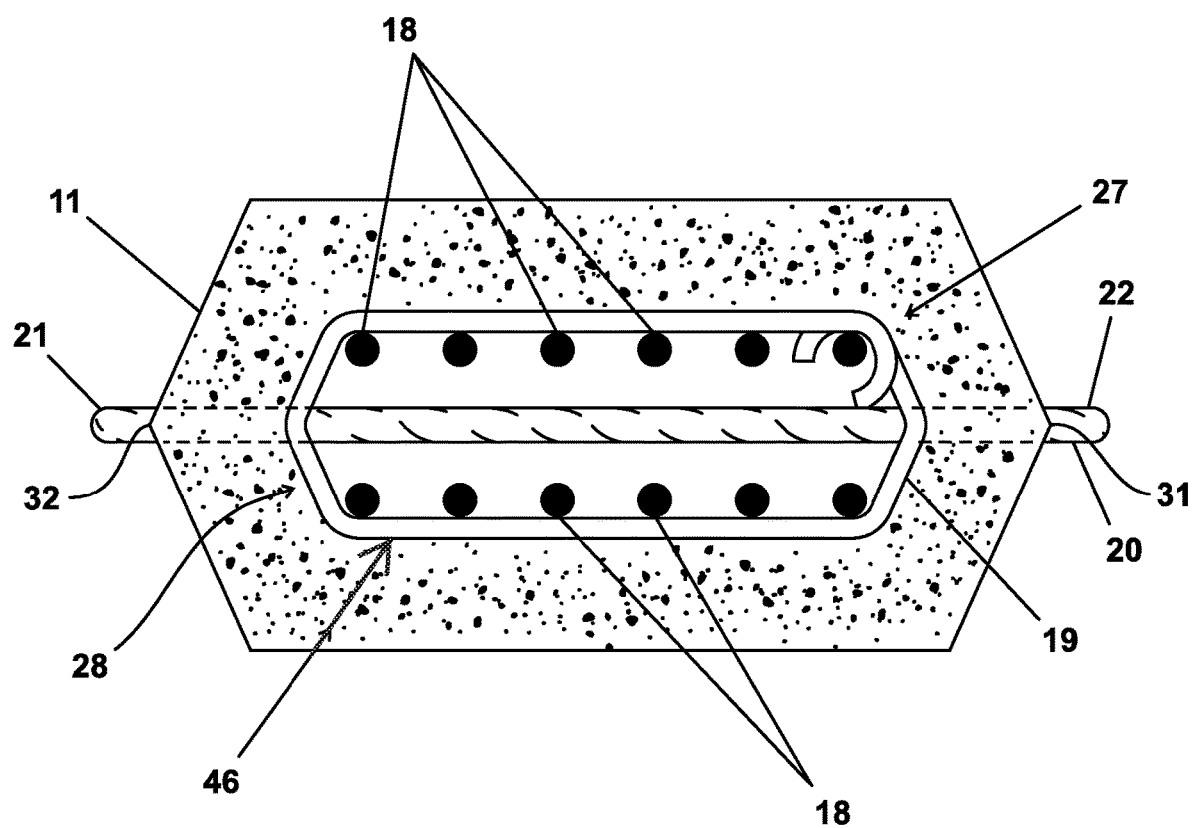
FIG. 6 is a side sectional view of a preferred embodiment of the apparatus of the present invention.
Figure 9:
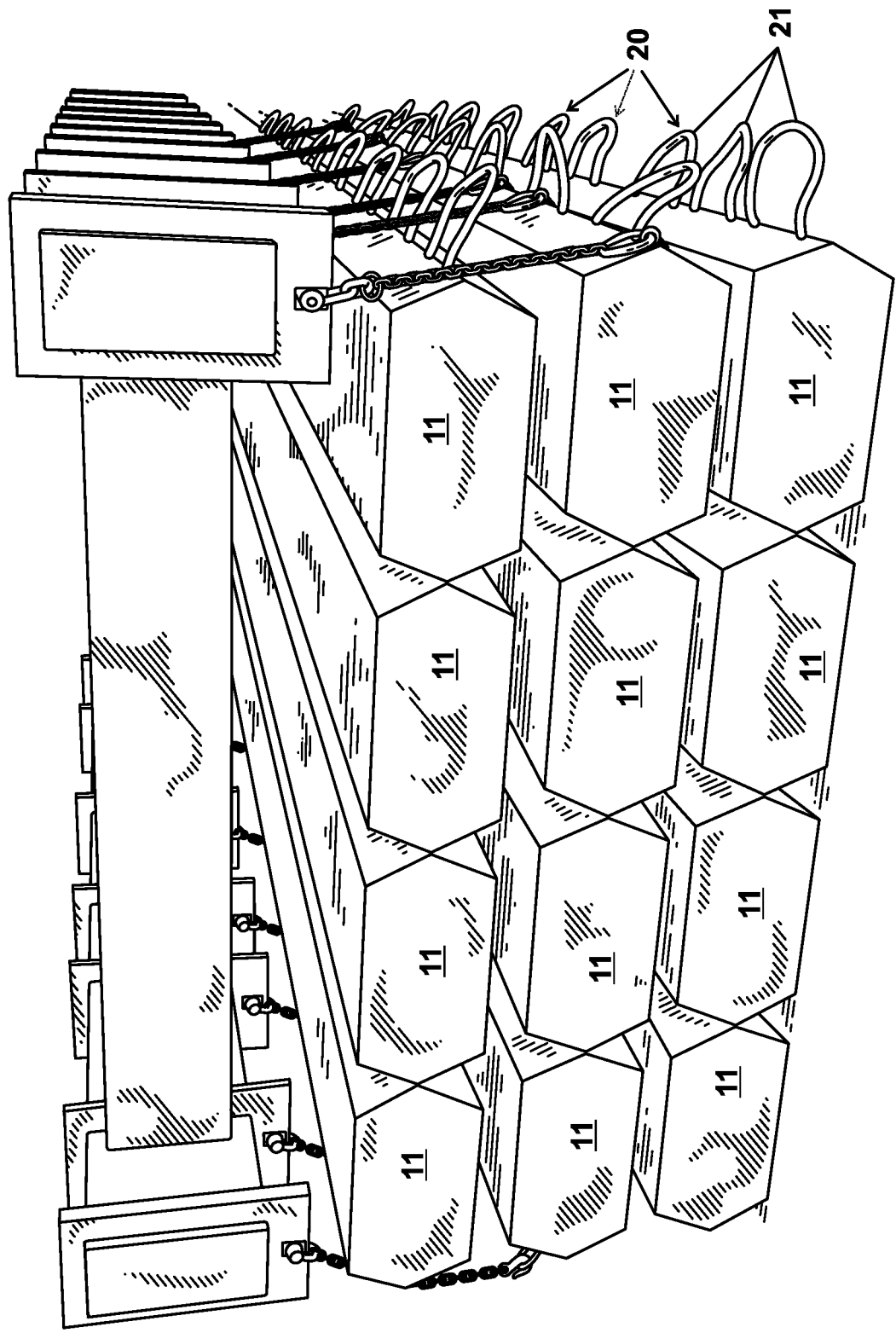
FIG. 9 is a perspective view of a preferred embodiment of the apparatus of the present invention.

FIGS. 1-8 show preferred embodiments of the apparatus of the present invention designated generally by the numeral 10. Mat apparatus 10 is preferably formed of a plurality of elongated concrete members or beams 11. As seen in FIG. 1, there can be a plurality of, for example, four (4) elongated concrete members 11 to form overall mat 10. Mat 10 can be about 40 feet (12.2 meters) long and about 8 feet (2.4 meters) wide as an example. The mat 10 preferably provides an edge at 23, an edge at 24, an end at 25, and an end at 26. The edges 23, 24 can preferably be parallel. The ends 25, 26 can preferably be parallel as seen in FIGS. 1 and 8. Cabling 20 preferably extends from one loop to another loop. In one embodiment of the present invention, the loops can be formed by one continuous endless rope or cable 20. Cable or rope 20 can be made of polypropylene or another similar material. In another embodiment of the present invention, endless loops can be used, each extending through preferably all (e.g., four) of the beams 11 and between a pair of loops 21 and 22. In one embodiment of the present invention, each beam or elongated concrete member 11 can be, for example, about two feet (61 cm) wide and about one foot (30.5 cm) tall as seen in FIGS. 5-7. Each of the surfaces 14, 15 preferably forms an obtuse angle with surface 12 as seen in FIG. 5. Similarly, the surfaces 16, 17 each preferably form an obtuse angle with the surface 13 as seen in FIG. 5.

Figure 10:
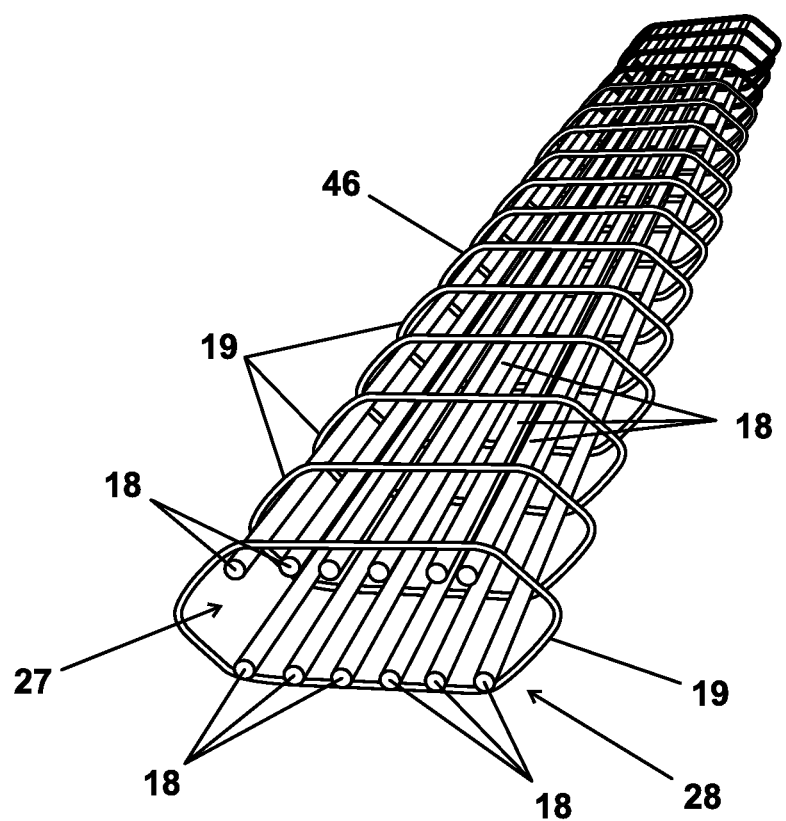
FIG. 10 is a perspective view of a preferred embodiment of the apparatus of the present invention.

In FIG. 6, elongated reinforcing bars 18 can be provided, preferably in multiple groups. The groups include an upper group 27 and a lower group 28. In one embodiment of the present invention, each of these bars 18 can be #7 reinforcing bars. The upper group 27 of reinforcing bars 18 would preferably be in the upper half of the concrete beam or member 11. Similarly, the lower group 28 of reinforcing bars 18 would preferably be in the lower half of the concrete beam or member 11 as seen in FIGS. 6 and 10. Rope or cable 20 can extend out each side of beam or member 11 and through another of said beam or member 11 (see FIG. 4). Rope or cable 20 can extend through beams 11 in between the upper and lower longitudinally extending reinforcing bars 27, 28, as seen in FIG. 6

Stirrups or ties 19 or other encircling reinforcing bars can preferably be provided, preferably at spaced apart locations as seen in FIG. 10, such as one per foot (30.5 cm) spacing. Stirrups 19 can be #4 stirrups as an example. When connected together, as shown in FIG. 1, each beam or concrete member 11 can form an angle with the beam or concrete member 11 next to it such as when the surface 16 or 17 of one beam can move closer to the corresponding surface 16 or 17 of an adjacent beam 11. One beam 11 is thus able to articulate or pivot relative to the beam 11 next to it. The pivoting of one beam 11 relative to another beam 11 can enable contact of the surface 16 or 17 with surface 16 or 17 of the adjacent beam 11.

In various preferred embodiments of the present invention, the reinforcing shown in FIGS. 6-7 can extend the full length of the elongated concrete member or beam 11 or about 90% of the length of the elongated concrete member or beam 11 or between about 60% and 70% of the length of the beam or concrete member 11.

In one embodiment of the present invention, the surfaces 14 and 17 meet at an edge 32. Similarly, in one embodiment of the present invention the surfaces 15 and 16 meet at an edge 31. The cabling 20 can extend from an edge 31 or 32 of one beam 11 to an edge 31 or 32 of an adjacent beam or member 11.

Figure 11:
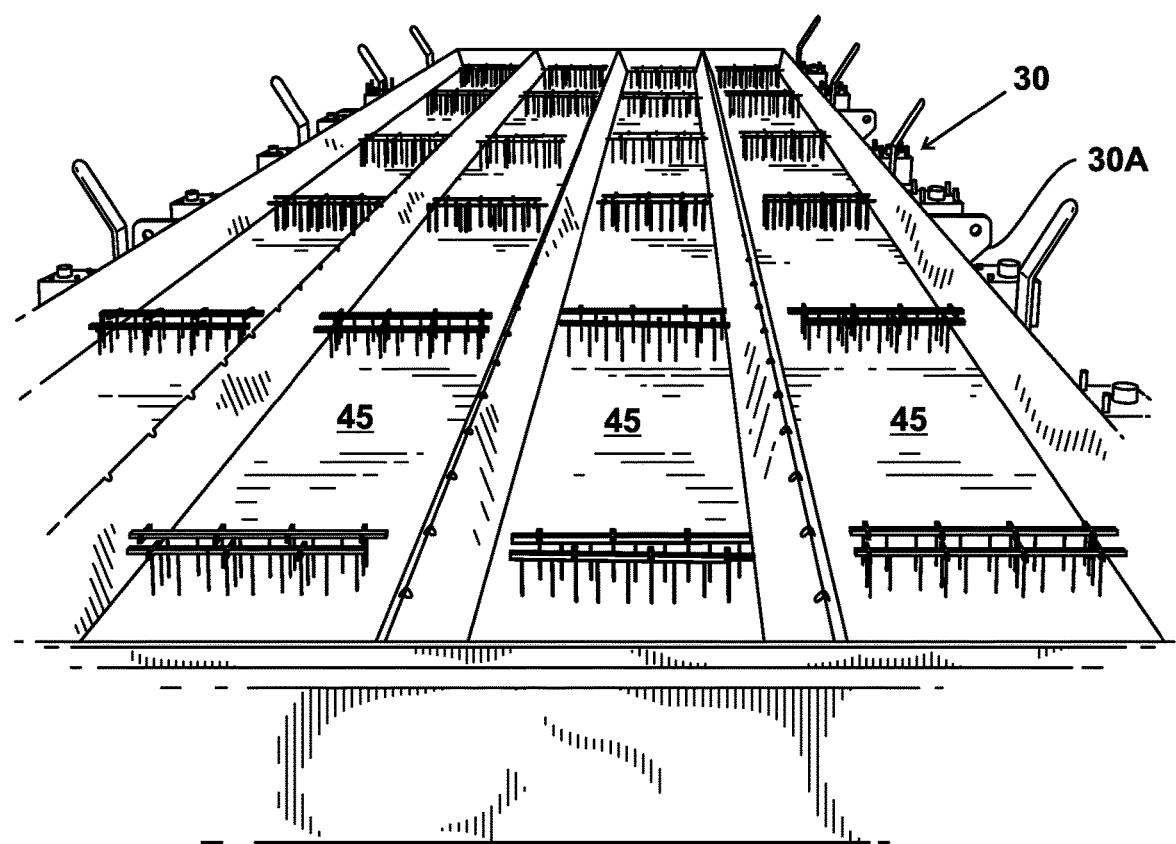
FIG. 11 is a partial perspective view of a preferred embodiment of the apparatus of the present invention.
Figure 12:
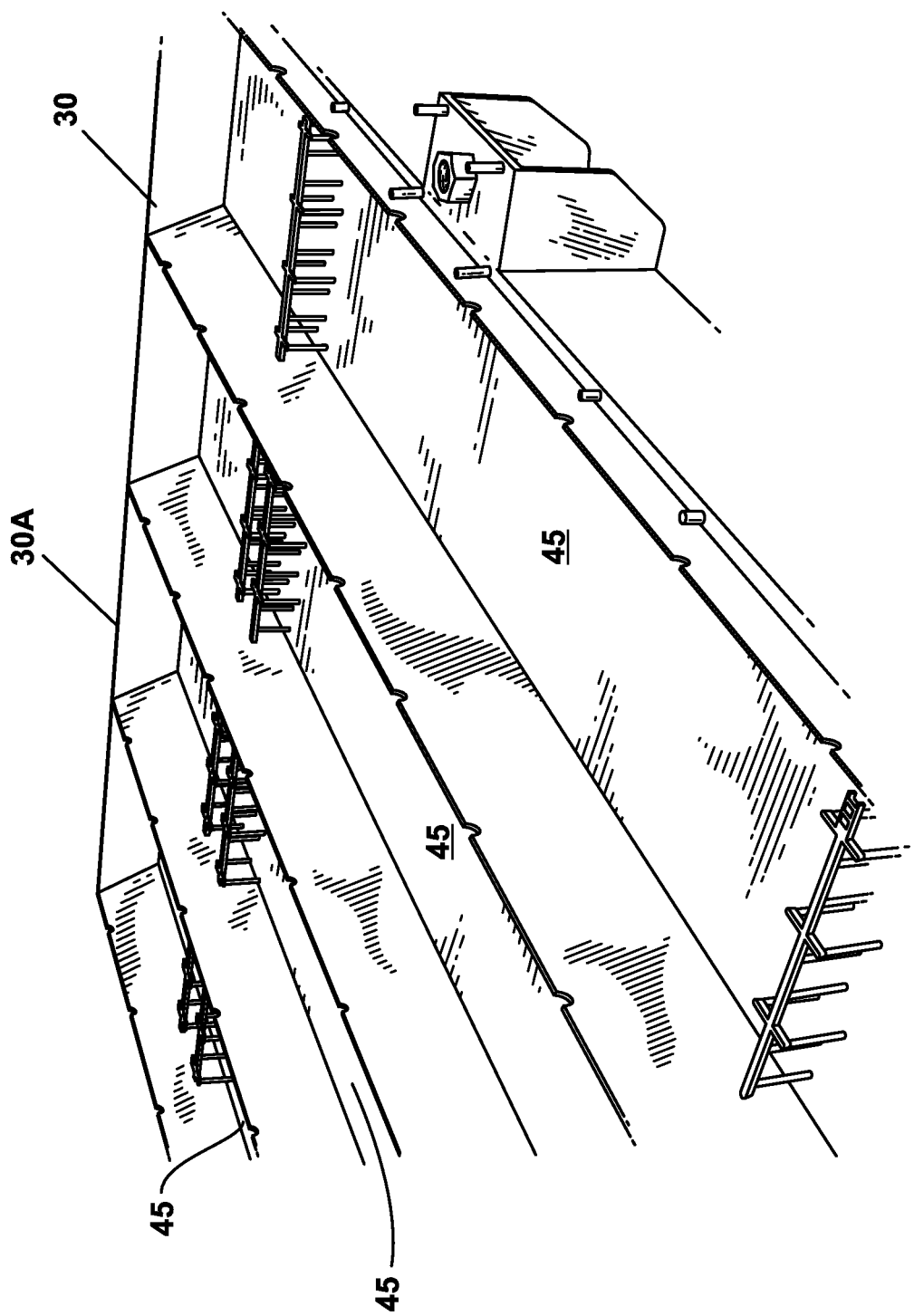
FIG. 12 is a partial perspective view of a preferred embodiment of the apparatus of the present invention.
Figure 13:
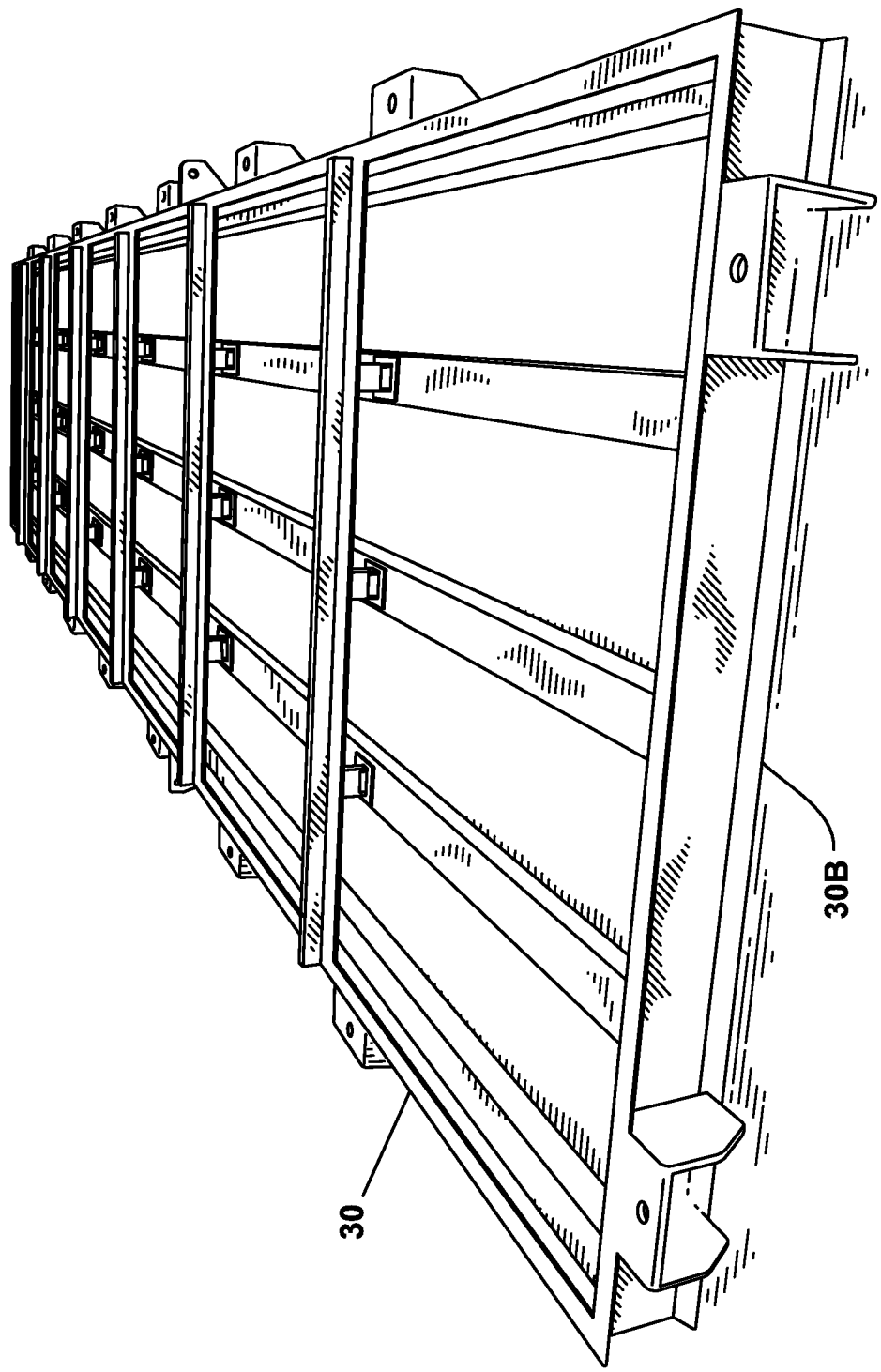
FIG. 13 is a perspective view of a preferred embodiment of the apparatus of the present invention.

FIGS. 11-13 are views showing a mould 30 that could be used to construct an elongated concrete member 11. Mould 30 has a lower section 30A and an upper section 30B. Lower section 30A shapes bottom surface 13 and inclined surface 16, 17. Upper section 30B shapes upper surface 12 and inclined surfaces 14, 15. Mould 30 lower 30A and upper 30B sections form ends 25, 26. For the mat 10 shown in FIG. 1, four mould cavities 45 would be placed side by side to form lower section 30A. The rope or cable 20 would preferably extend from one mould cavity 45 to the next mould cavity 45 and from one loop 21 to the other loop 22 for each of the loops. The rope or cable 20 would be positioned in between the upper group of longitudinal reinforcement bars 27 and the lower group of longitudinal reinforcement bars 28 for each beam 11 as seen in FIG. 6. In one embodiment of the present invention, the concrete members 11 can be between about 0 and 1 inch (0 and 2.5 cm) apart. In one embodiment of the present invention, the beams 11 can be for example between about 20 and 40 feet (6.1-12.2 meters) in length as seen in FIGS. 2 and 3. FIGS. 11-13 show mould 30 in more detail. Mould 30 is filled with a reinforcement 46 as seen in FIGS. 6-7 and 10. As seen in FIG. 10, there can be stirrups 19 spaced at intervals. A transverse cable section 47 of rope/cable 20 can be positioned between each pair of stirrups 19 (see FIG. 1). For example, the stirrups 19 can be one foot (30.5 cm) apart. The transverse cable sections 47 can also be about one foot (30.5 cm) apart. Each transverse cable section 47 can be in between two stirrups 19 spaced about six inches (6") (15.2 cm) from each stirrup 19 closest to a particular transverse cable section 47. In FIG. 1, the arrows 48 show positions for the stirrups 19. In one embodiment, there is a stirrup 19 between each pair of transverse cable sections 47. In FIG. 1, there can be forty (40) transverse cable sections 47 and between thirty-nine and forty-one (39-41) stirrups 19.

Figure 18:
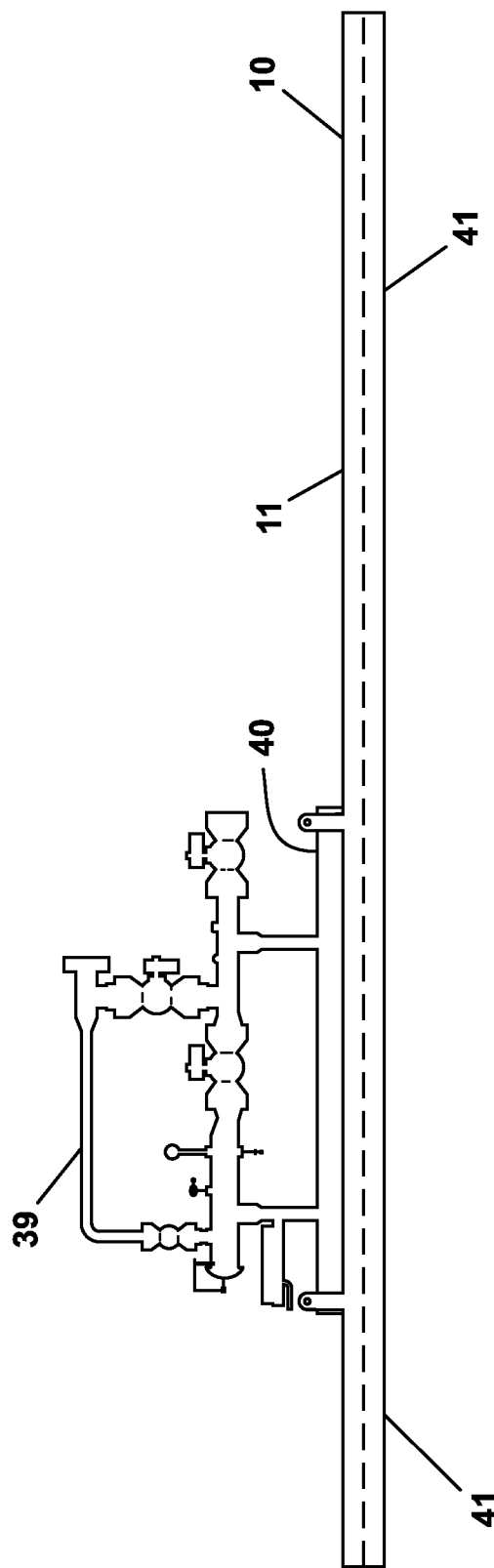
FIG. 18 is an elevation side view of a preferred embodiment of the apparatus of the present invention showing an underwater equipment support.
Figure 19:
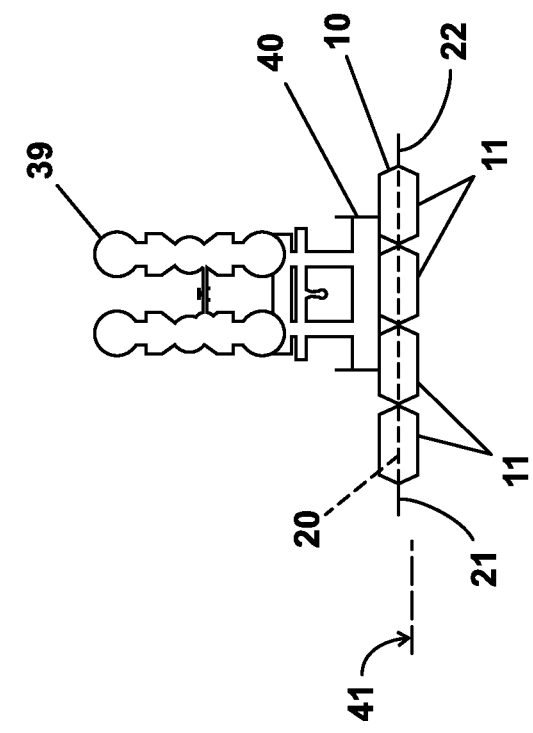
FIG. 19 is an elevation end view of a preferred embodiment of the apparatus of the present invention showing an underwater equipment support.

FIGS. 14-19 show other embodiments of the apparatus of the present invention in an underwater environment supporting a pipeline 33 (FIGS. 14 and 15), a pipeline 37 and 38 crossing or bridge (FIGS. 16 and 17) and an equipment support 39 (FIGS. 18 and 19).

Figure 14:
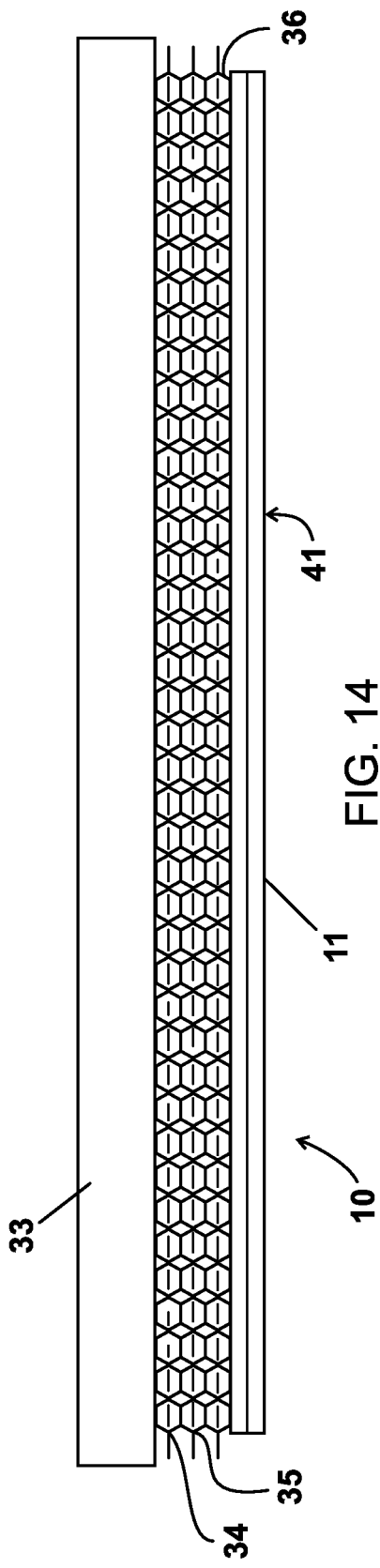
FIG. 14 is a side, elevation view of a preferred embodiment of the apparatus of the present invention showing the support of an underwater pipeline.
Figure 15:
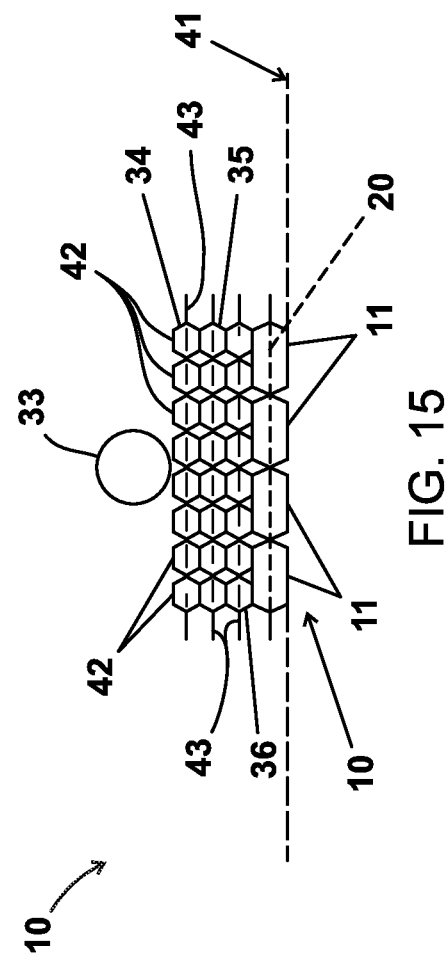
FIG. 15 is an end, elevation view of a preferred embodiment of the apparatus of the present invention showing the support of an underwater pipeline.

In FIGS. 14 and 15 there can be seen a mat apparatus 10 resting on a seabed or water bottom 41. In FIGS. 14 and 15, mat apparatus 10 is shown with four (4) elongated concrete members or beams 11 connected with a cable or cables 20. The mat 10 in FIGS. 14-15 can be as shown and constructed in accordance with FIGS. 1-13. A four (4) beam 11 mat 10 can be seen in FIGS. 1 and 8. Such a four (4) beam 11 mat 10 can be seen in FIGS. 14-15.

Placed upon mat 10 in FIGS. 14-15 are multiple layers of articulating mats. These layers of articulating mats can include upper layer 34, middle layer 35 and lower layer 36. Such articulating mat or mat layers 34, 35, 36 can be seen for example in prior U.S. Pat. Nos. 8,858,118; 9,518,366; 9,797,105 entitled "Erosion Control Mat System". U.S. Pat. Nos. 8,858,118; 9,518,366; 9,797,105 are each hereby incorporated herein by reference. Each mat layer 34, 35, 36 is comprised of a plurality of concrete or concretions blocks 42 interconnected by cables 43. In FIGS. 14-15, each beam 11 can have a width. Each block 42 can also have a width. Preferably, the beam 11 width is greater than the block 42 width as seen in FIG. 15. As an example, the beam 11 can have a width that is about twice as large as the width of a block 42 (see FIG. 15).

FIGS. 16 and 17 show a bridge arrangement where a pipeline 38 rests on a seabed or water bottom 41. The apparatus 10 supports a second pipeline 37 in an elevated position using beams 11 and articulating mat layers 34, 35, 36 in two spaced apart supports 10A, 10B. There is a gap 44 in between supports 10A, 10B. Pipeline 38 occupies the gap 44 while resting on seabed or water bottom 41. Pipeline 37 spans across the gap 44 and rests upon supports 10A, 10B.

FIGS. 18 and 19 show an article of equipment 39 such as an assembly of pipe, valves and fittings. Assembly 39 rests upon a skid or base 40. Base 40 rests upon mat apparatus 10 which rests on a seabed or water bottom 41. Mat 10 includes beams 11 and can be interconnected by cables 20.

Figure 20:
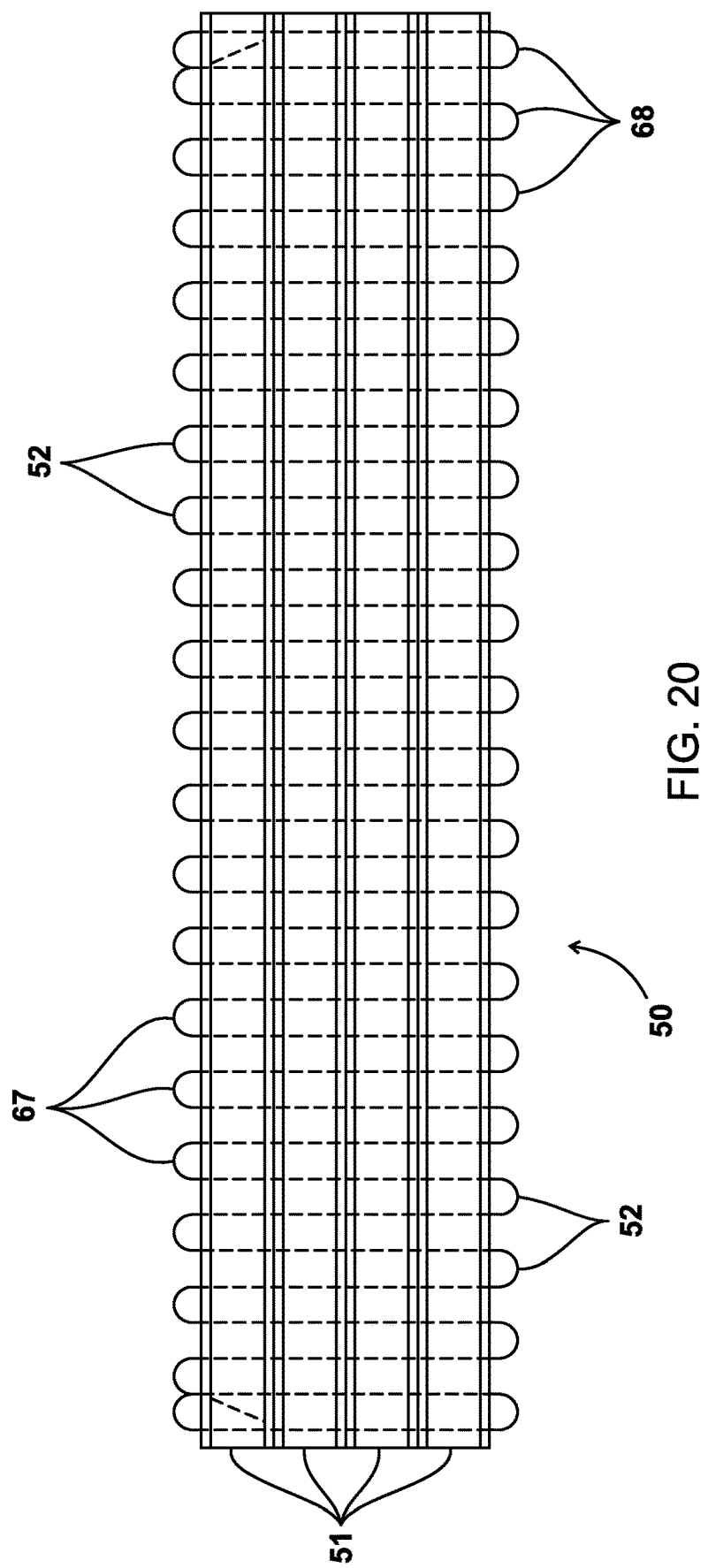
FIG. 20 is a plan sectional view of another embodiment of the apparatus of the present invention.

FIGS. 20-32 show an additional embodiment of a method and apparatus of the present invention, designated generally by the numeral 50. Mat apparatus 50 can be comprised of a number of generally parallel beams or concrete members 51 that are preferably connected with an elongated cable or rope 52. As with other preferred embodiments, the cable or rope 52 (or cables or ropes 52) forms a plurality of loops 67, 68 each preferably extending from an edge portion of concrete member or beam 51 as seen in FIGS. 20, 23. Each beam or concrete member 51 preferably has an upper surface 53, lower surface 54, and inclined surfaces 55, 56, 57, 58. Surfaces 55, 57 preferably intersect at an edge 59. Surfaces 56, 58 preferably intersect at an edge 60.

Figure 21:
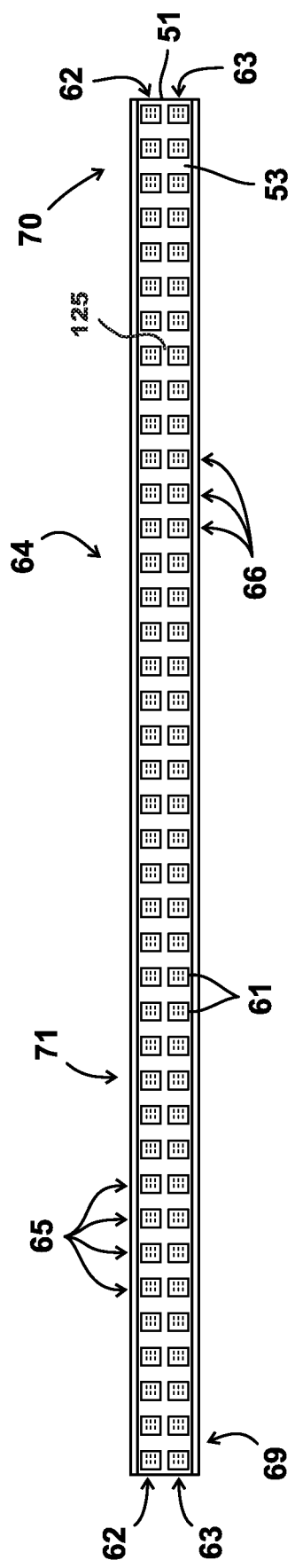
FIG. 21 is a plan view of another embodiment of the apparatus of the present invention.
Figure 22:
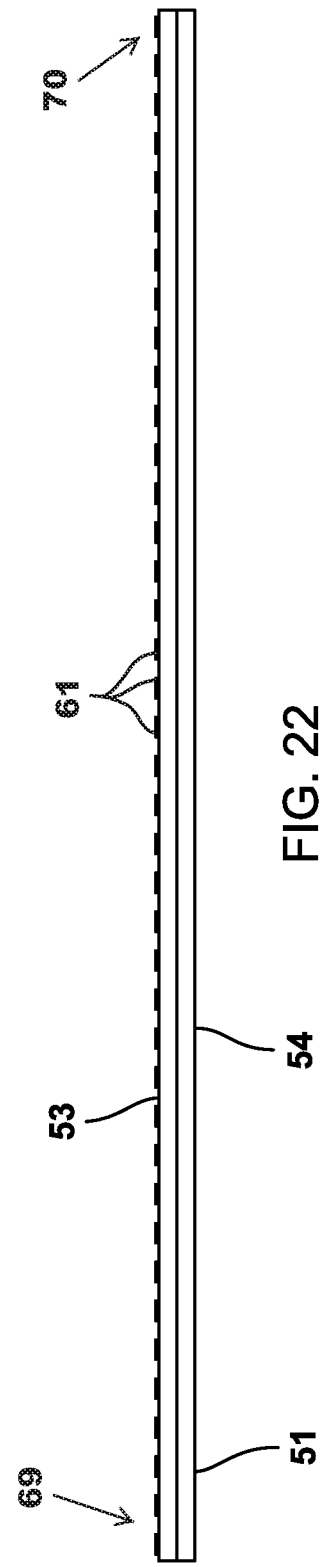
FIG. 22 is an elevation view of another embodiment of the apparatus of the present invention.
Figure 23:
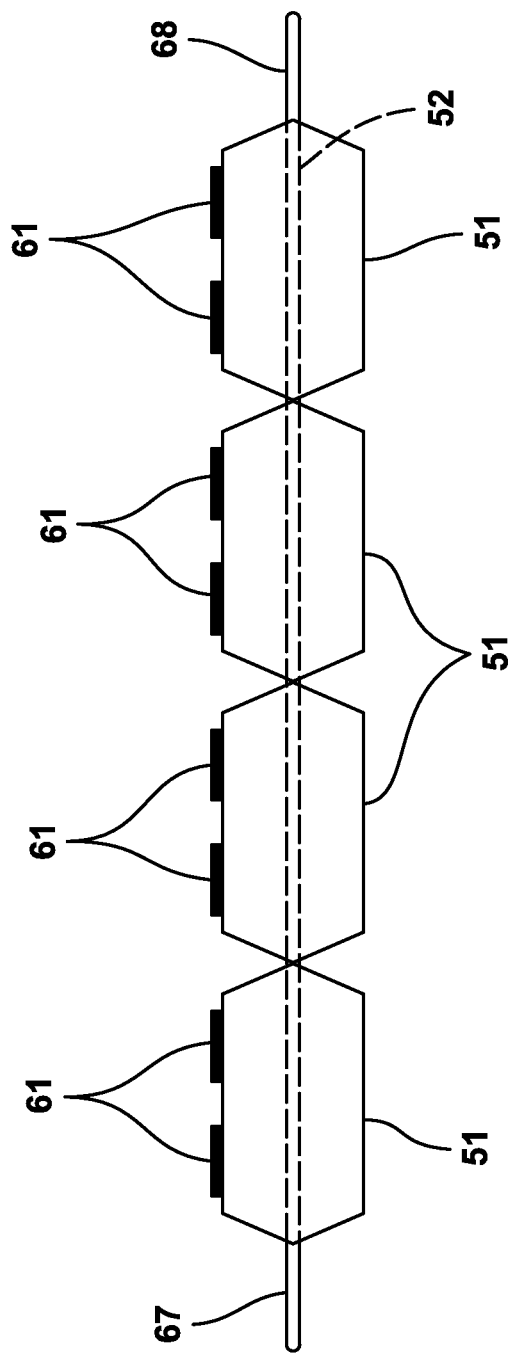
FIG. 23 is a partial side view of another embodiment of the apparatus of the present invention.
Figure 24:
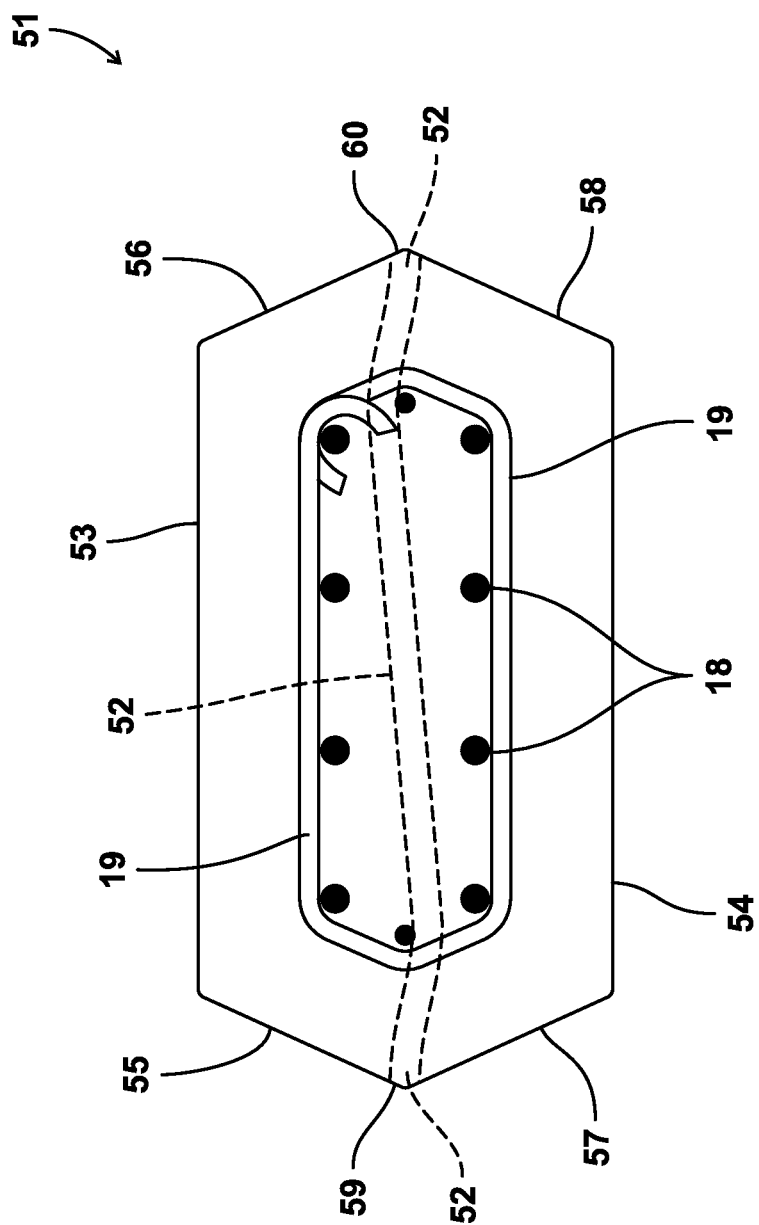
FIG. 24 is a sectional view of another embodiment of the apparatus of the present invention.
Figure 29:
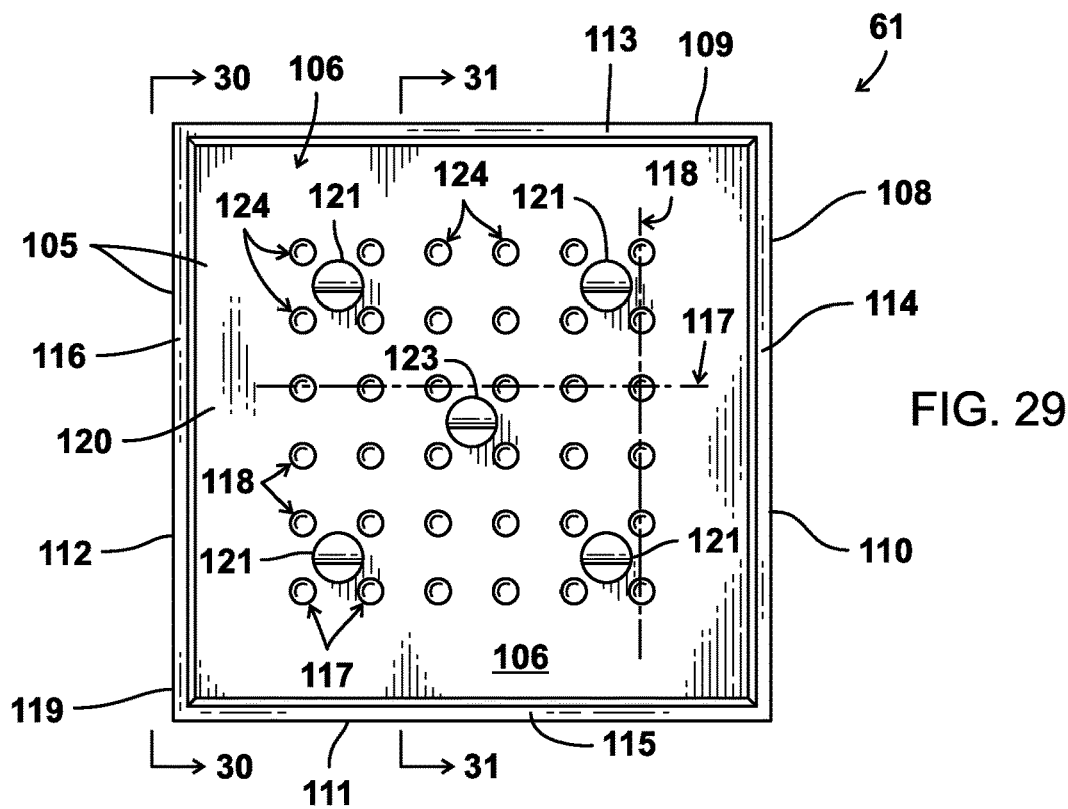
FIG. 29 is a fragmentary top view of the embodiment of FIGS. 20-28 showing the pad.
Figure 30:
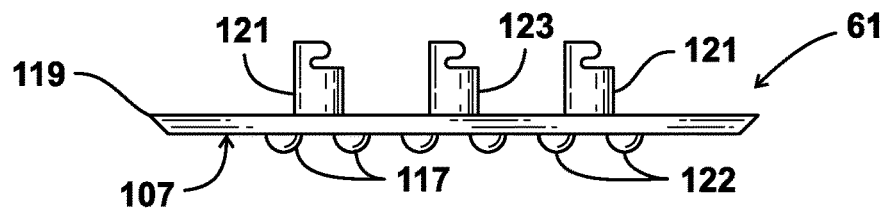
FIG. 30 is a fragmentary sectional view taken along lines 30-30 of FIG. 29.
Figure 31:
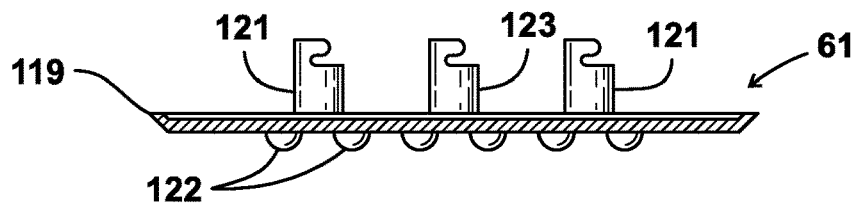
FIG. 31 is a fragmentary sectional view taken along lines 31-31 of FIG. 29.
Figure 32:
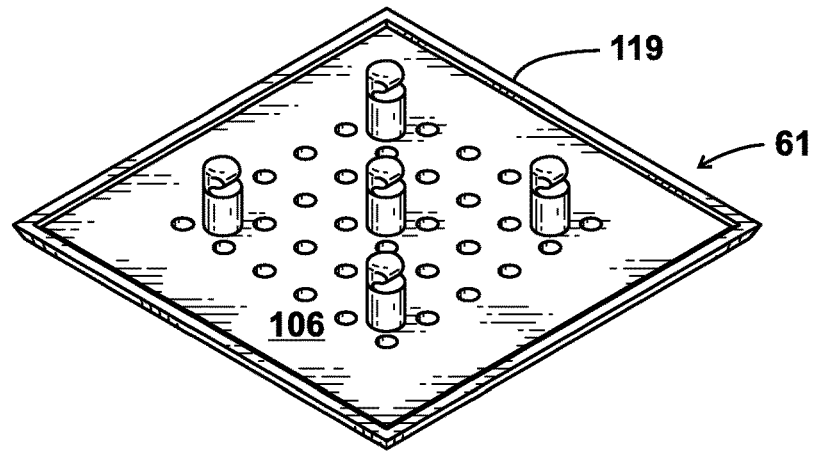
FIG. 32 is a fragmentary perspective view showing the pad of FIGS. 29-31.

On upper surface 53, pads 61 can preferably be abutting as seen in FIGS. 25-28 or preferably arranged in spaced apart positions or array 64 as seen in FIGS. 21-22, such as about ½ to 4 inches apart. There can be at least two columns 65, 66 of the pads 61 of the array of pads 64. There are preferably two rows 62, 63 of pads 61 as shown in FIGS. 21, 25 and 27. There can be a space 125 in between the two rows 62, 63 of pads 61, as seen in FIGS. 21, 25 and 27. In FIG. 28, the pads 61 can preferably abut one against the other so that three rows of pads that can preferably cover upper surface 53 of each beam 51. In one embodiment, spacing between pads 61 can be farther apart near end portions 69, 70 (e.g., between about 2 and 4 inches apart) and closer together at central portion 71 (e.g., between about ½ and 2 inches apart). Pads 61 can be as shown and described in U.S. Pat. No. 9,797,105 which is hereby incorporated herein by reference. Such a pad 61 can be seen in FIGS. 29-32. Pad 61 can be flat, such as by removing border portion 119.

Boot or pad 61 can be about 8¾" (22.2 cm) long and about 8¾" (22.2 cm) wide. Boot or pad 61 has a panel 105 with upper surface 106 and lower surface 107. Lower surface 107 can be about 8½" (21.6 cm) long and about 8½" (21.6 cm) wide. Panel 105 can have a border portion 119 and base portion 120 (see FIG. 29). Border portion 119 can be about ⅛" (0.3 cm) thick. Base portion 120 can be about ⅛" (0.3 cm) thick. Boot or pad 61 has a periphery 108 that includes edges 109-112. Each edge 109-112 can have a beveled or inclined surface. Edge 109 has beveled or inclined surface 113. Edge 110 has beveled or inclined surface 114. Edge 111 has beveled or inclined surface 115. Edge 112 has beveled or inclined surface 116. Border portion 119 can be eliminated so that both surfaces 106, 107 can be flat surfaces.

Surface 106 has a plurality (e.g. five (5) posts or anchors 121 as shown in FIGS. 29-32). The posts or anchors 121 can thus be configured as shown. The four posts or anchors 121 that are located near the edges of the panel 105 can each be located about 2⅜" (6.0 cm) from the edges of panel 105. One post 123 can be at the central portion or center of pad 61. Posts or anchors 121, 123 can extend about 1⅜" (3.5 cm) from the lower surface 107 of panel 105.

Lower surface 107 preferably has rows 117 and columns 118 of projections 122 (e.g. six (6) projections 122 in each row 117 and six (6) projections 122 in each column 118). Projections 122 can be located about 1" (2.5 cm) apart from each other on panel 105. The projections 122 located closest to the edges of panel 105 can be located about 1¾" (4.4 cm) from the edge of lower surface 107. Projections 122 can extend about ¼" (0.6 cm) from the under surface of panel 105. Each projection 122 can be generally hemispherically shaped. A concavity at 124 can be provided at each projection on upper surface 106.

FIGS. 27-28 illustrate that pads 61 near the central portion 71 of beam 51 can be of a contrasting color when compared to the pads 61 nearer to end portion 69, 70 of a beam 51. Thus, in FIGS. 25-28, pads 61 at central portion 71 can be yellow or white while pads 61 at or near end portions 69, 70 of each beam 51 can be black or dark gray. This contrasting of coloration helps guide an ROV (remotely operated vehicle) to the central portion 71 where a pipeline 33 is desirably placed as seen in FIGS. 25-26.

The following is a list of parts and materials suitable for use in the present invention:

PARTS LIST

| PART NUMBER | DESCRIPTION |
| --- | --- |
| 10 | mat apparatus |
| 10A | support |
| 10B | support |
| 11 | elongated concrete member/beam |
| 12 | upper flat surface ' |
| 13 | lower flat surface |
| 14 | inclined surface |
| 15 | inclined surface |
| 16 | inclined surface |
| 17 | inclined surface |
| 18 | longitudinally extending reinforcing bar |
| 19 | tie/encircling reinforcing bar/stirrup |
| 20 | rope/cable |
| 21 | loop |
| 22 | loop |
| 23 | edge |
| 24 | edge |

-continued

PARTS LIST

| PART NUMBER | DESCRIPTION |
|---|---|
| 25 | end |
| 26 | end |
| 27 | upper group |
| 28 | lower group |
| 30A | lower section |
| 30B | upper section |
| 30 | mould |
| 31 | edge |
| 32 | edge |
| 33 | pipeline |
| 34 | articulating mat |
| 35 | articulating mat |
| 36 | articulating mat |
| 37 | pipeline |
| 38 | pipeline |
| 39 | equipment/pipe, valve and fitting assembly |
| 40 | base/skid |
| 41 | water bottom/seabed |
| 42 | block |
| 43 | cable |
| 44 | gap |
| 45 | mould cavity |
| 46 | reinforcement/reinforcement assembly |
| 47 | transverse cable section |
| 48 | arrow |
| 50 | mat apparatus |
| 51 | elongated concrete member/beam |
| 52 | cable/rope |
| 53 | upper surface |
| 54 | lower surface |
| 55 | inclined surface |
| 56 | inclined surface |
| 57 | inclined surface |
| 58 | inclined surface |
| 59 | edge |
| 60 | edge |
| 61 | pad |
| 62 | row |
| 63 | row |
| 64 | array |
| 65 | column |
| 66 | column |
| 67 | loop |
| 68 | loop |
| 69 | end portion |
| 70 | end portion |
| 71 | central portion |
| 105 | panel |
| 106 | upper surface |
| 107 | lower surface |
| 108 | periphery |
| 109 | edge |
| 110 | edge |
| 111 | edge |
| 112 | edge |
| 113 | beveled/inclined surface |
| 114 | beveled/inclined surface |
| 115 | beveled/inclined surface |
| 116 | beveled/inclined surface |
| 117 | row of projections |
| 118 | column of projections |
| 119 | border portion |
| 120 | base portion |
| 121 | post/anchor |
| 122 | projection |
| 123 | post/anchor |
| 124 | concavity |
| 125 | spacing/space |

All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only; the scope of the present invention is to be limited only by the following claims.

The invention claimed is:

1. A concrete mat apparatus, comprising:
  (a) a plurality of elongated concrete members, each member being aligned with and next to another concrete member;
  (b) each of the elongated concrete members having an upper generally flat surface defining a plane, a lower generally flat surface, and a plurality of inclined surfaces that each extend away from an upper or lower surface, wherein the inclined surfaces include first and second inclined surfaces positioned on opposite sides of said upper surface;
  (c) reinforcement that extends from a first end portion of each concrete member to a second end portion thereof, said reinforcement including a plurality of longitudinally extending reinforcement bars;
  (d) cabling that connects each of the elongated concrete members to another of said elongated concrete members, said cabling including generally parallel cable sections, each cable section extending transversely through multiple of said concrete members;
  (e) wherein the combination of elongated concrete members has a width and a length that is at least twice as long as the width;
  a plurality of loops along opposed edges of the mat, each loop formed by a portion of said cabling;
  (g) an array of multiple pads connected to the upper surface of each concrete member and having a pad lower surface occupying said plane, wherein each said pad is spaced apart from others of said pads and wherein said concrete member upper surface extends from each pad to another said pad;
  (h) said array including a plurality of rows of said pads positioned inwardly of and in between said first and second inclined surfaces; and
  (i) subsea equipment supported by said elongated concrete members, said subsea equipment engaging said pads.

2. The concrete mat apparatus of claim 1 wherein there are at least three of said elongated concrete members.

3. The concrete mat apparatus of claim 1 wherein there are at least two columns of said pads of said array of pads.

4. The concrete mat apparatus of claim 3 wherein some of the pads of one said columns are of differing shapes.

5. The concrete mat apparatus of claim 1 wherein the pads are rectangular.

6. The concrete mat apparatus of claim 1 wherein there are a first plurality of pads with a first spacing between pads and a second plurality of pads with a second spacing that is greater than said first spacing.

7. The concrete mat apparatus of claim 1 wherein the reinforcement includes a plurality of upper longitudinally extending reinforcement bars and a plurality of lower longitudinally extending reinforcement bars.

8. The concrete mat apparatus of claim 1 wherein each of the loops are positioned at the intersection of an upper inclined surface and a lower inclined surface.

9. The concrete mat apparatus of claim 1 wherein the upper plurality of longitudinally extending reinforcement bars is positioned in between two upper inclined surfaces.

10. The concrete mat apparatus of claim 1 wherein the plurality of longitudinally extending reinforcement bars are positioned in between two lower inclined surfaces.

11. The concrete mat apparatus of claim 1 wherein the cabling is positioned in a plane that is in between the said upper and lower pluralities of longitudinally extending reinforcement bars.

12. The concrete mat apparatus of claim 1 wherein each of the pads of said array is at least partially embedded in a said concrete member.

13. The concrete mat apparatus of claim 1 wherein the loops are formed of a plurality of endless circular rope sections, each endless rope section including a said first and a said second spaced apart loops.

14. The concrete mat apparatus of claim 1 wherein some of the pads are square and some of the pads are rectangular.

15. The concrete mat apparatus of claim 1 wherein the pads are differing shapes.

16. The concrete mat apparatus of claim 1 wherein each pad has anchors that extend into the concrete member.

17. A concrete mat apparatus, comprising:
(a) a plurality of elongated concrete beam members, each concrete beam member being aligned with and next to another concrete beam member;
(b) each of the concrete beam members having an upper generally flat surface, a lower generally flat surface, and first and second inclined surfaces that each extend away from said upper or lower surface;
(c) reinforcement that extends from a first end portion of each concrete beam member to a second end portion thereof, said reinforcement including a plurality of longitudinally extending reinforcement bars;
(d) cabling that connects each of the elongated concrete beam members to another of said elongated concrete beam members;
(e) wherein the combination of elongated concrete beam members has a width and a length that is at least twice as long as the width;
(f) a plurality of loops along opposed edges of the mat, each loop formed by a portion of said cabling;
(g) an array of multiple pads connected to the upper surface of each concrete beam member to define a padded beam surface, wherein each pad is spaced apart from others of said pads and wherein said concrete beam member upper surface extends from each said pad to another said pad;
(h) said array including a plurality of rows of said pads positioned inwardly of and in between said first and second inclined surfaces; and
(i) subsea equipment supported by said elongated concrete beam members, said subsea equipment including a pipe section resting upon the padded beam surfaces.

18. The concrete mat apparatus of claim 17 further comprising one or more layers of articulating block mats supported upon the concrete members.

19. The concrete mat apparatus of claim 18 wherein the subsea equipment is resting upon the articulating mat layer or layers so that load transfer is from the subsea equipment, to the articulating mat layer or layers, to the elongated concrete members and to a seabed or water bottom.

20. A concrete mat apparatus, comprising:
(a) a plurality of elongated concrete members, each member being aligned with and next to another concrete member;
(b) each of the concrete members having an upper generally flat surface, a lower generally flat surface, and first and second inclined surfaces that each extend away from said upper surface;
(c) reinforcement that extends from a first end portion of each concrete member to a second end portion thereof, said reinforcement including a plurality of longitudinally extending reinforcement bars;
(d) cabling that connects each of the elongated concrete members to another of said elongated concrete members, said cabling including generally parallel cable sections, each cable section extending transversely through multiple of said concrete members;
(e) wherein the combination of elongated concrete members has a width and a length that is at least twice as long as the width;
multiple pads on said upper surface of each said concrete member, said multiple pads covering a majority of the area of each said upper surface;
(g) wherein each said pad is spaced apart from others of said pads, said multiple pads including multiple rows on said upper surface in between said first and second inclined surfaces and multiple columns of pads;
(h) wherein there are a first plurality of pads with a first spacing between pads and a second plurality of pads with a second spacing that is greater than said first spacing; and
(i) subsea equipment positioned above and supported by said concrete members, said subsea equipment including a pipe section bearing on one or more of said pads.

21. The concrete mat apparatus of claim 20 wherein there are at least two columns of said pads of said multiple pads.

22. The concrete mat apparatus of claim 20 wherein there are a first plurality of pads with a first spacing between pads and a second plurality of pads with a second spacing that is greater than said first spacing.

23. The concrete mat apparatus of claim 20 wherein each of the pads of said multiple pads is at least partially embedded in a said concrete member.

24. The concrete mat apparatus of claim 20 wherein some of the pads are square and some of the pads are rectangular.

25. The concrete mat apparatus of claim 20 wherein the pads are differing shapes.

26. The concrete mat apparatus of claim 20 wherein some of the pads of one said columns are of differing shapes.

27. The concrete mat apparatus of claim 20 wherein the subsea equipment rests upon the pads of multiple said concrete members.

28. The concrete mat apparatus of claim 20 wherein the subsea equipment rests upon multiple rows of said pads.

* * * * *